United States Patent [19]
Guichard et al.

[11] Patent Number: 5,909,251
[45] Date of Patent: Jun. 1, 1999

[54] IMAGE FRAME FUSION BY VELOCITY ESTIMATION USING REGION MERGING

[75] Inventors: Frederic Guichard, West Los Angeles; Leonid I. Rudin, Los Angeles, both of Calif.

[73] Assignee: Cognitech, Inc., Pasadena, Calif.

[21] Appl. No.: 08/835,591

[22] Filed: Apr. 10, 1997

[51] Int. Cl.$^6$ .................................................. H04N 7/24
[52] U.S. Cl. ............................................ 348/416; 382/236
[58] Field of Search ................................ 348/845.1, 402, 348/407, 413, 416, 699; 382/180, 236; H04N 7/24

[56] References Cited

U.S. PATENT DOCUMENTS

| | | | |
|---|---|---|---|
| 5,012,336 | 4/1991 | Gillard | 348/699 |
| 5,043,810 | 8/1991 | Vreeswijk et al. | 348/413 |
| 5,535,302 | 7/1996 | Tsao | 348/699 |
| 5,627,905 | 5/1997 | Sebok et al. | 348/416 |

*Primary Examiner*—Howard Britton
*Attorney, Agent, or Firm*—Michaelson & Wallace

[57] ABSTRACT

A process for performing image frame fusion on a pixel-by-pixel basis by estimating velocities and occlusions between at least two image frames of a sequence of frames. For each pixel, the possible matchings are those that minimize changes in a selected parameter of the image (generally the grey-level). The process uses a region-growing procedure to reduce the number of possible matchings for each pixel. The output is a decomposition of the images into regions in which pixels move with the same model of velocity or are all occluded. The process includes a multi-scale description of velocities between two images, a multi-scale segmentation of the images into regions having different motion, a correcting term for sampling errors, sub-pixel motion errors and an occlusion estimation step. A preferred embodiment employs pyramidal calculations.

23 Claims, 8 Drawing Sheets

IMAGE FRAME FUSION BY VELOCITY ESTIMATION USING REGION MERGING

BACKGROUND OF THE INVENTION

1. Technical Field

The present invention relates to image processing and enhancement by fusion of plural image frames. The invention performs frame fusion on a pixel-by-pixel basis by estimating velocities and occlusions between two frames. For each pixel, the possible matchings are those that minimize changes in a selected parameter of the image (generally the grey-level).

2. Background Art

Finding velocities in a sequence of images requires following points along their motion in the image. That is, when not occluded, the pixels of the current image are associated with the pixels of the next image. This association is based on the relative constancy of a given quantity estimated from the images at each pixel. In general, this quantity is the grey level value of the pixel, since it does not present large variation during motion. But, it might be defined on other measurements such as the curvature, the gradient and so forth. Given a velocity, one can define a measure that can say whether or not this velocity is accurate. We call this measure the "error". The error is based on the variation of the quantity along the motion defined by the velocity. Possible velocities will have small errors attached. Estimating the velocities in this case consists of finding velocities that have small errors. Unfortunately, this property is not enough to define a unique velocity field. Indeed, there might exist in the next frame many points having the same grey level (or other selected quantity) as those of a given point of the current frame. This is the well-known aperture problem, which must be solved in order to find the velocities. The probability of matching plural points in the image with the same velocities decreases by the number of points. Many techniques try to exploit this observation. For example, the well-known correlation technique tries to match by neighborhood (generally defined by a square). But, this arbitrary neighborhood might be too large and therefore mix points having different velocities, or conversely too small to solve the aperture problem. The neighborhood around each point should be composed of only the points that move with same velocity, which set of points shall be referred to in this specification as a "region". The problem is then that such "regions" are usually defined by velocities while being relied upon to provide an estimate of these same velocities.

A scene or image can include moving objects. Recovering the velocities requires performing a partitioning of the scene into objects (regions) and attributing to each region a model of velocity. The following sub-problems are easy to solve: (a) Given the velocities find the regions; and (b) Given the regions find the velocities. Unfortunately, in order to solve the entire problem exactly, one has to find regions and velocities simultaneously. Conventional approaches are based on the sequential use of techniques which solve one of the sub-problems stated above. The dominant motion approach involves processing a sequential estimation of the dominant motion, and the extraction of the attached region. Therefore this approach uses techniques that solve the first sub-problem on velocities that are obtained based upon the assumption of a dominant motion. A technique disclosed in Bouthemy et al., "Motion segmentation and qualitative dynamic scene analysis from an image sequence", *The International Journal of Computer Vision* Vol. 10, No. 2, pages 157–182, April 1993, employs sequential use of techniques which solve, alternately, the first and then the second sub-problem. This sequence of processes is not proved to converge, and requires a good initialization of both region and velocity estimates. A technique disclosed in Schweitzer, "Occam algorithms for computing visual motion", *IEEE Transactions on Pattern Analysis and Machine Intelligence* Vol. 17, No. 11, pages 1033–1042 (1995) employs a similar sequential process, but uses a splitting algorithm where regions are rectangles. This latter technique is sure to converge, but suffers from the over-simplification of the description of a region as a rectangle. Another disadvantage is that the initialization as one region for the entire picture might lead to a fixed point far from the solution. The aim of this latter technique is not necessarily to find the "good" velocities, but to find the best mapping in terms of compression. The problems of these techniques is that when solving the first sub-problem, they try to find velocities from unknown regions (and therefore possibly erroneous), and when solving the second sub-problem they try to find regions from unknown velocities.

Many techniques dealing with the problem of finding a unique global motion of a scene have been developed successfully. Even if all of these techniques can not be applied in general to recover multiple motions, some attempts have been proposed in some particular cases. The most significant example is the technique of publication of Bouthemy et al. referred to above. The hypothesis of a dominant image motion proposed in Cloutier et al., "Segmentation and estimation of image motion by a robust method", *Proc. IEEE* pages 805–809 (1995), assumes that the observed scene is made from moving objects having very different sizes (for example a little object and a large background.) A least median of squares estimators based on optical flow constraints is performed on the entire image to extract the model of the dominant motion. Then, the first subproblem is solved according to the knowledge of the dominant velocity: the region corresponding to the dominant motion is found. Once this dominant object has been detected, it is removed from the region of analysis, and the same process is repeated on the remaining part of the image. Two limitations on the use of this technique are: first, the underlying hypothesis is in general too restrictive for a real sequence, and, secondly, the link between dominant motion and dominant object must be investigated. Indeed, once the dominant motion has been computed, one has to decide for each point whether or not it moves according to the dominant motion and therefore whether or not it belongs to the dominant object. This decision is made by local estimates around each pixel, and by an a priori thresholding, and therefore is very sensitive to noise.

Bouthemy et al.'s Motion Segmentation

Bouthemy et al. assume in their publication cited above that they initially have a segmentation of the velocities (for example obtained by dominant motion approach), and they propose a technique to improve its quality. They start their algorithm with the segmentation $R_i$, $V_i$, where $V_i$ is the velocity model associated to the region $R_i$. Then, they make the boundary of the region move in order to decrease an energy which balances the matching error with the length of the boundaries. They recompute the velocity within the region when a significant change of shape of the region occurs. The initial velocity is used for initialization of the new estimation. Their algorithm suffers many problems. First, the initial segmentation has to be near the solution. Therefore their algorithm has to be seen as a way to improve the quality of velocity estimate rather than an algorithm that calculates the velocity. Secondly, the algorithm is not proved to converge. Moreover, it is very sensitive to local extreme. Thirdly, it attributes one (and only one) velocity to each region, and the segmentation of the region is based on these velocities. It is in a sense a segmentation from velocities estimation, whereas it should be velocity estimate from a segmentation. Finally, the occlusions are not taken into account.

Schweitzer's Algorithm.

The publication by Schweitzer cited above formulates the problem of motion estimation as a search for a function that can accurately predict frames. It balances the velocity field based upon determinations of (a) how good the prediction is and (b) how simple it is. The first requirement is measured as usual by the error terms. The simplicity of the vector field is set by Schweitzer in terms of encoding length. His algorithm is based on a segmentation procedure by splitting rectangles. Each rectangle is split horizontally or vertically into two other rectangles if the splitting increases the quality of the prediction more than a cost based on the increase of the complexity (appearance of a new rectangular region). Unfortunately, given a rectangle, the location of the split or boundary is problematic. In the algorithm of Schweitzer, one needs estimates of the velocities for each point in the rectangles. And, the segmentation depends on the pre-calculated velocities. Finally, the rectangle-based segmentation might not be sufficient to take into account non-rectangular objects.

Morel et al.'s Grey-Scale Segmentation of Images

A gray-scale segmentation technique disclosed in Morel et al., "Variational methods in image segmentation", in H. Brezis, editor, *Progress in Nonlinear Differential Equations and Their Applications*, Birkhauser, 1995 which produces a piece-wise constant image that approximates the original image. The approximation is scaled: the larger the scale, the bigger the regions (the pieces of the segmentation). They propose to balance the quality of the approximation (which is measured by the grey-level difference between the original image and its approximation) by the complexity of the approximation (measured by the total length of the boundaries). They initialize the process by considering each pixel as a region. Then they merge regions if the merging decreases the following energy:

$$E = \int (u(x) - u_o(x))^2 + \lambda \text{Length}(B_u)$$

where $u_o$ denotes the original image, u its piece-wise constant approximation, $B_u$ the boundaries of the regions of u, and $\lambda$ a scale parameter. The algorithm ends when merging is no longer possible. Of course Morel et al.'s algorithm for segmenting grey-scale images does not give any information about velocities.

SUMMARY OF THE DISCLOSURE

The invention is embodied in a process for obtaining information from at least two image frames of a sequence of frames, each of the frames including an array of pixels, each pixel having an amplitude, one of the two frames being designated as a reference frame and the other being a non-reference frame, the process including:

(1) defining a set of velocities with which the motion of pixels between the two frames may be modeled; dividing each one of the two frames into plural regions;

(2) determining an error for each one of at least some of the velocities by carrying out the following steps for each one of the regions and for each union of pairs of the regions:

(A) mapping each pixel of the non-reference frame into the reference frame in accordance with the one velocity, (B) computing an error amount which is a function of a difference in pixel amplitude attributable to the mapping;

(C) designating a minimum one of the error amounts computed for the velocities as the error for the one velocity, whereby a respective error is associated with each of the regions and with each union of pairs of the regions without regard to velocity; and (3) merging qualified ones of the regions by the following steps:

(A) computing for each pair of regions a merging scale which depends upon a gain including a function of
(a) the sum of the errors of each pair of regions and
(b) the error of the union of the pair of regions;

(B) merging each pair of the regions for which the merging scale meets a predetermined criteria.

The merging scale preferably depends also upon a cost including a function of (a) the sum of the lengths of the boundaries of each pair of regions and (b) the length of the boundary of the union of the pair of regions.

The step of determining an error for each one of at least some of the velocities can include determining an error for each one of all of the velocities.

The process can further include, after the step of merging:

erasing the individual pairs of regions which have been merged and defining their unions as individual regions; and repeating the steps of (a) computing an error for each one of at least some of the velocities, (b) computing a merging scale and merging each pair of regions for which the merging scale meets the criteria, whereby the process includes plural repetitive iterations.

Preferably the step of determining an error for each one of at least some of the velocities includes determining the error for a limited set of the velocities, the limited set of the velocities corresponding to those velocities associated with the N smallest errors computed during a prior iteration of the process, wherein N is an integer.

If each limited set of velocites associated with the N smallest errors is different for different regions, then the step of determining an error includes:

designating as the maximum error for a given region the largest error computed for that region in any prior iteration of the process;

and the step of computing the merging scale includes determining for each pair of regions whether a velocity included in the limited velocity set of one of the regions is not included in the limited velocity set of the other of the pair of regions, and assigning as the corresponding error for the other region the maximum error.

The mapping includes computing a new pixel amplitude in accordance with a weighted average of pixel amplitudes mapped into the reference frame, wherein the weight of each pixel amplitude mapped into the reference frame is a decreasing function of the mapped pixel's distance from a given pixel location in the reference frame.

The mapping step of mapping pixels from the non-reference frame to the reference frame is a forward mapping, and the process can further include determining which ones of the pixels are occluded by carrying out the following steps:

(I) determining which pixels were not matched from the non-reference frame to the reference frame by the merging step following the forward mapping step and removing the pixels not matched from the reference frame;

(II) performing the step of determining an error and the step of merging, except that the mapping step includes a backward mapping of mapping from the reference frame to the non-reference frame, the backward mapping step employing a version of the reference frame in which the pixels not matched have been removed;

(III) determining which pixels were not matched from the reference frame to the non-reference frame by the merging step following the backward mapping step and removing the pixels not matched from the non-reference frame;

(IV) comparing the pixels remaining in the reference frame with the pixels remaining in the non-reference frame, and repeating steps I, II and III if there is a difference beyond a predetermined threshold.

The process assigns a velocity to each remaining pixel in the non-reference frame and then adds the remaining pixels of the non-reference frame to the reference frame in accordance with the velocity assigned to each pixel of the non-reference frame to produce an enhanced frame.

The process can further include deblurring the image of the enhanced frame to produce a super frame.

The dividing step can initialize the regions so that each pixel is an individual region.

The model velocities include at least one of: the set of translational velocities, the set of rotational velocities, or the set of zooms.

Preferably, the unions of pairs of regions constitute unions of pairs of adjacent regions only.

The merging scale is computed as a ratio obtained by dividing the cost by the gain, and wherein the predetermined criteria includes a maximum scalar value of the ratio above which merging is disallowed. The scalar value is selected in a range between an upper limit at which the entire image is merged and a lower limit at which no pixels are merged.

The process further includes defining the set of velocities as a simple set during the first one of the iterations of the process, and supplementing the set of velocities with additional velocities as the size of the regions grows. Preferably, the simple set includes the set of translational velocities, and the additional velocities include the set of rotational velocities and the set of zoom velocities.

The reference and non-reference frames can lie in a moving sequence of frames depicting an image having motion, the process further including designating one of the sequence of frames as the reference frame and successively designating others of the sequency of frames as the non-reference frame, and performing all of the foregoing steps for each one of the successive designations of the non-reference frame, whereby the superframe contains information from all the frames of the sequence. Furthermore, the process can further include designating successive ones of the sequence of frames as the reference frame and repeating all of the foregoing steps for each designation of the reference frame so that a super frame is constructed for each one of the sequence of frames.

The step of assigning a velocity to each remaining pixel can be carried out by selecting the velocity for the region of that pixel having the minimum error.

DETAILED DESCRIPTION OF THE INVENTION

Figure 1:
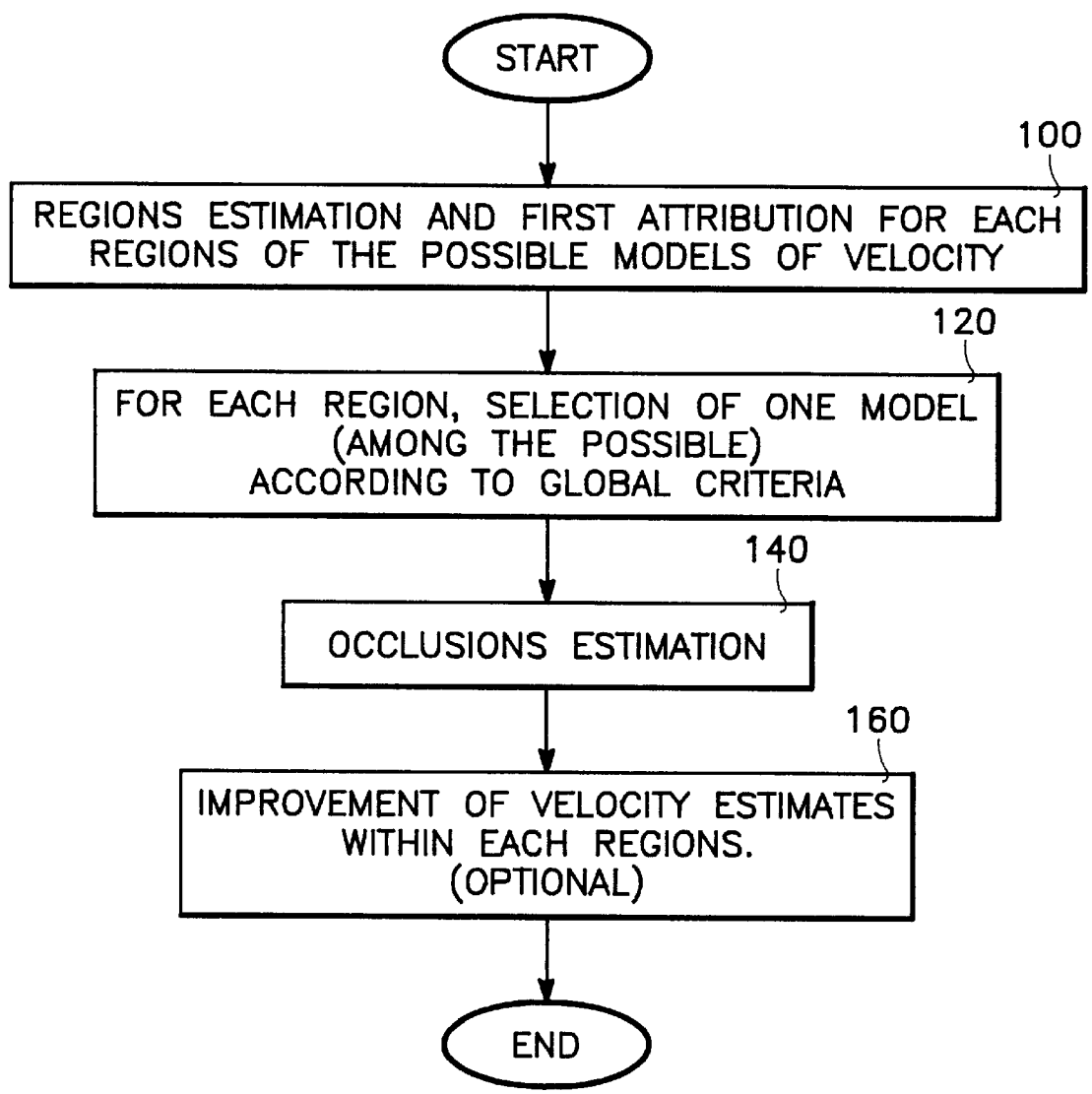
FIG. 1 is a block flow diagram of the velocity estimate process of the invention.

Introduction:

The present invention enhances an image by the fusion of plural image frames. The invention performs frame fusion on a pixel-by-pixel basis by estimating velocities and occlusions between two frames. For each pixel, the possible matchings are those that minimize changes in a selected parameter of the image (generally the grey-level). The invention uses a region-growing procedure to reduce the number of possible matchings for each pixel. Its output is a decomposition of the images into regions in which pixels move with the same model of velocity or are all occluded. The technique includes a multi-scale description of velocities between two images, a multi-scale segmentation of the images into regions having different motion, a correcting term for sampling errors and sub-pixel motion errors, and an occlusion estimation step. A preferred embodiment employs pyramidal calculations.

The problem of defining regions and of estimating velocities is solved in the present invention by first defining the regions without any estimate of the velocities. The invention attaches one velocity model to each region. All points in a region do not necessarily move with the same velocity, because the region might be in rotation, and then all the points of this region have different velocities, but they at least all belong to one "model" of velocity which is the given rotation. In one example, all the points of a region can share the same model of velocity, but this model of velocity can be defined with different velocities for different points of the region. There is no limitation in the invention in the possible models of velocity that can be observed within an object in a real sequence of images. The only restriction is the smoothness that should satisfy a velocity field within a object. In one embodiment, the invention approximates the entire set of possible models by a limited set of models that correspond to elementary motions. The limited set may be refined in a progressive sequence of approximation, starting with, for example, the set of translations (which corresponds to a kind of 0th order approximation), then the set of the affine motions (a first order approximation) and then the set of quadratic motions (a second order approximation). In any case, the invention does not rely on a particular choice of a set of models. Therefore, this set can be defined by the user according to an expected approximation.

The invention first estimates the regions without using any estimate or guess of the velocities. Instead, a region is defined as a set of points which can move with the same model of velocity whatever the velocities. (In contrast, conventional techniques attribute one particular velocity to the region.) Then, after having computed the regions, the velocities are estimated for each region.

A velocity field between two frames is approximated by a piece-wise regular function, since it is made by moving objects. Each piece is a region, and the regions make a partition of the entire image. The regularity of the velocity field inside each region can be described by a continuous or discrete set of "velocity models" (set of affine, set of continuous, set of translation motions, and so forth). The invention estimates the velocities between two frames by satisfying the following principle: The velocity field is the vector field that fits in a minimal number of regions that constitute a partition of the image. The term "fitting in a region" means that the vector field is regular (that is in the given set of models), and minimizes the variation along the motion of a quantity based on the images (like grey-level value). The trade-off between the minimal number of regions and the minimization of discrepancies in grey-level is scaled by a scale parameter. The scale parameter is natural and physically built-in, in the sense that the notion of objects is a scaled notion. The scale corresponds to the degree of simplification with which motions are observed. At coarse scale, one only cares about major objects moving and not little details within these shapes that have some slightly different motions. However, such details will be present at a finer scale. Therefore, regions obtained at a coarse scale must be consistent with the regions obtained at any finer scale. This constitutes the "inclusion principle" that we believe is necessary (because physically natural) for any scaled motion estimator. If the principle leads to non-unique velocity fields, then among the possibilities, the one which has the less disparities between the velocity fields of the others regions can be chosen. As a final step, occlusions are defined by the non-bijective part defined by the velocity fields backward and forward. (As employed in this specification, the term "bijective" refers to correspondence—e.g., via a velocity—between pixels in different frames.) Such forward and backward matchings can be performed or computed in the same process.

A preferred embodiment carries out the foregoing by the following steps:

1. Computation of the regions without any attribution or estimation of velocities. The computation of the regions are made by a region merging procedure: two adjacent regions are merged if according to the images they can move together (i.e., without loss of correspondence between corresponding pixels) whatever their motion is. The merging of two regions follows the algorithm proposed by Morel and al. for the grey-level segmentation of the images.
2. While the regions are computed, the possible models of velocities inside each region are computed. In case of non-uniqueness, the models that are consistent with the maximum number of regions are chosen.
3. The occlusions are then computed from the non-bijective part of the computed matching backward and forward.

Multi-Scale Segmentation of the Velocities—Formation of the Regions:

In forming the regions, grouping several pixels can be disadvantageous because one can group pixels moving with different velocities. The idea is then to group pixels that "can all move" with at least one model of velocities. The invention accomplishes this grouping using the same region-growing procedure as that disclosed in the publication of Morel et al. referenced above to segment grey-level images into piece-wise continuous regions. In order to carry out the region formation process, the following elements are input:

a set of possible velocity models (pw constant, affine . . . ): W a measure of how accurate is a given velocity field in a region: E(R, V)

a measure defined on the connected sets of all R: M(R), such that the gain of merging: $M(R_i)+M(R_j)-M(R_i \cup R_j)$ is positive.

a scale parameter: $\lambda \geq 0$.

Given all these ingredient, there is defined a criteria to determine whether or not two regions have to be merged. We said that we want to merge regions that can "move" with the same model of velocity. The ability to "move" is measured by the minimal error term among the possible models of velocity, but this error preferably should not be compared with an arbitrary term. Therefore the invention compares the minimal error of merged regions, and the minimal errors of the two regions taken separately. (As understood in this specification, the term "error" refers to discrepancy in a selected parameter between corrresponding pixels in different frames, such as a discrepancy in pixel grey level.) Given two regions $R_i$ and $R_j$, the invention then considers the quantity:

$$C_E(R_i, R_j) = \min_{V \in W} E(R_i \cup R_j, V) - \min_{V \in W} E(R_i, V) - \min_{V \in W} E(R_j, V)$$

This quantity is always positive (by definition of the errors), it represents the "cost" in terms of the error of the merging of the two regions $R_i$ and $R_j$. If the two regions can move with the same velocity model, this cost is small. This cost is then balanced with the "gain" of merging which is defined by the functions M:

$$G(R_i, R_j) = M(R_i) + M(R_j) - M(R_i \cup R_j)$$

The balance is scaled by the scale parameter $\lambda$:

$$\text{balance} = C_E(R_i, R_j) - \lambda G(R_i, R_j)$$

A negative balance indicates that the "gain" (scaled by $\lambda$) is bigger than the cost, and therefore the regions can be merged. Conversely, a positive balance prevents the merging. The balance decreases from a positive value as $\lambda$ increases, is positive when $\lambda$ is equal to zero, and becomes negative as $\lambda$ tends to infinity. The scale, at which the balance is negative and merging possible is called the "merging scale". We define the merging scale between two regions $R_i$ and $R_j$ by:

$$P(R_i, R_j) = C_E(R_i, R_j) / G(R_i, R_j)$$

Given a scale parameter $\lambda$, all adjacent regions having a merging scale less than $\lambda$ are merged. The merging are ordered with respect to the merging scale.

The Scale Parameter

The parameter $\lambda$ controls the complexity of the result of the minimization of the cost-functional. By choosing $\lambda=0$, one ends up with every pixel as a region. Conversely, choosing $\lambda$ big enough, there will remain only one region corresponding to the entire image. We believe the multi-scale estimation of the velocities is best, since its reflects natural behavior. For example, the image of a moving car has a global velocity that fits for the entire region defined by the car: the observation scale of the velocities is large. Conversely, by looking closely, all the parts of the car are not moving with the same velocity where the observation scale is small. Depending on the application or the information that needs to be recovered, one will have to look at different scales. Choosing the optimum value $\lambda$, that is the $\lambda$ which leads to the expected representation of the true velocity field, is not necessarily possible without minimum knowledge about the images. Therefore, it is very important that the segmentation results present some similarities between scale. These similarities are usually set in the following principle, hereinafter referred to as the inclusion principle, that should satisfy any scaled-segmentation: $\forall \lambda, \mu$, such that $\lambda > \mu \geq 0$, the set of the regions obtained at scale $\lambda$ is a set of subsets of the regions obtained at the scale $\mu$. In other words, the regions at scale $\lambda$ can be obtained by merging the regions obtained at scale $\mu$. E(R, V) measures how accurate is the velocity model V in the region R. In the ideal case, if V is the true velocity, one has E(R, V)=0. Therefore, choosing $\lambda$ very small, region-merging will occur until the entire region moving with V is recovered, while any other merging will merge regions moving with different velocity models and thus create errors. Unfortunately, in practice, the value of E(R, V) is corrupted by the noise, and also by the fact that the selected set of models of V is an approximation of the possible true velocities. These two kinds of perturbations can not be quantified a priori, and therefore produce arbitrary scaled value of errors. These errors have to be balanced with the scale parameter, and this is also the rule of $\lambda$. Depending on the shape of the error E(R, V), these two perturbations of the images by noise will have different consequences on the estimate of E(R, V).

Link Between Scale and Noise Ratios.

In the presence of noise, the error E(R, V) is corrupted by the same amount of noise as the image is corrupted. Therefore, at small scales the velocity estimations are corrupted by noise. These perturbations disappear at a scale that is linked to the variance of the noise.

Link Between Scale and Difference Between Models of V and True Velocities.

In the same way, if $V_0$ is the true velocity flow in a region R, and V is the best velocity model that approximates $V_0$, writing $V = V_0 + \epsilon$, one has $$|E(R, V) - E(R, V_0)| \leq \|\epsilon\|_{R,2} * \left\| \frac{\partial E}{\partial V} \right\|_{R+V,2}$$

where $\|\cdot\|_{R,2}$ stands for the $L^2$ norm in the region R. E(R, V) is the error that will be found, and E(R, $V_0$) is the error that would be obtained if V was the true velocity. The extra-error, which is shown here in the difference, depends on the difference between the true velocity and the modelized velocity. This extra error will be balanced with the gain of merging, and therefore the scale is also related to the approximation of the velocities made by the set of models.

Occlusions

Since videos are made of moving objects, some points present in one image might be occluded in the next one, and conversely points of the next image can be occluded in the current one. The problem is how to define a criteria which determines whether or not a point of a given image is present or occluded in the other image. Conventional criteria are based on the size of the errors-matching, and therefore involve a kind of threshold. In the present invention, occlusions are preferably defined without grey level threshold-based techniques, but rather as a direct result of the velocity estimate. The invention uses the fact that the (true) velocity field is bijective on the non-occluded parts. Therefore, finding occlusions relies on the decomposition of the matching into two components: bijective and non-bijective ones. The points related to the non-bijective part are the "occlusion" points. In other words, given two images $u_1$ and $u_2$, let $X_1$ and $X_2$, respectively be the set of pixels of $u_1$ and $u_2$, respectively: the matching of $u_1$ towards $u_2$ associates each pixel of $X_1$ to a pixel of $X_2$. But, not necessarily all the pixels of $X_2$ are associated to a pixel of $X_1$ by this matching. (The matching is not necessarily bijective.) Therefore $X_2$ can be decomposed into two sets: $H_2$ and $O_2$. $H_2$ is the "hits" subset, that is the subset of the points of $X_2$ that are associated to at least one point of $X_1$. And $O_2$ is the complementary subset of $H_2$ in $X_2$. Then, any point of $O_2$ is not, according to the matching, present in $X_1$. Therefore the points of $O_2$ are some points of $X_2$ which are occluded in $X_1$.

Measuring the Accuracy of a Velocity Field, and Sampling Problems.

Continuous Image: Classical definitions of optical flow involve a kind of conservation assumption: points moving with optical flow have a constant grey level (or a small variation of their grey level), except for the occluded pixels. Thus, the velocity field V between frame $u_1$ and frame $u_2$ is accurate if the quantity:

$$er(x, V) = |u_1(x) - u_2(x + V(x))|$$

is small for every non-occluded point. Thus, the quantity er(x, V) defines a possible measure of accuracy of the velocities.

Discrete Image: A discrete image is represented by an array of pixels: u(i,j), which is a representation of the real intensity function u(x). u(i,j) corresponds to a mean value of u on the pixel surface. The problem is how to translate the quantity to a discrete formulation. Given the two images $u_1(i,j)$ and $u_2(i,j)$, the process compares the value of $u_1$ at the pixel (i,j), with the value of $u_2$ at the "position" (i,j)+V(i,j). The problem is that this position is not necessarily an integer (for a non-integer shift) and then does not denote a pixel. Therefore the value $u_2((i,j)+V(i,j))$ is not defined. Moreover this value can not in general be deduced from the values of the image $u_2$ at the neighbor pixels. One possible solution to this problem is to subtract from the error term any possible contribution of the sampling error. This possible contribution depends on the shape of the intensity function u. For a u which has its variation bounded, we propose the following definition for the sampling error:

$$er((i,j),V) = \max(|u_1(i,j) - BLI(u_2,(i,j) + V(i,j))| - 2\alpha L, 0)$$

where BLI(u,x) denotes a bi-linear interpolation of u at location x, $\alpha$ is the minimal square-distance between V(i,j) and the center of a pixel (therefore $\alpha$ is always less than one half the size of a pixel), and L is linked to the bound of the variation of u by $L = \max_{x,e} |u(x) - u(x+e)|$, where e is a unit vector. Since L is in unknown, we propose to approximate its value by:

$$L = \min\left(\max_e |u_1(i,j) - u_1((i,j)+e)|, \max_e |u_2(\tilde{i},\tilde{j}) - u_2((\tilde{i},\tilde{j})+e)|\right)$$

where $(\tilde{i},\tilde{j})$ denotes the nearest pixel from (i,j)+V(i,j), and e denotes a unit pixel shift in any direction (1,0), (1,1), (0,1), . . .

Accuracy of a velocity field on a region: The measure of accuracy is simply defined by adding the quantities e(V(i,j),(i,j)) for each pixel (i,j) of the region: we set $$E(R, V) = \sum_{(i,j) \in R} er((i,j), V(i,j))$$

Since the error on a region is the sum of the errors of the pixels of the region, we always have:

$$E(R_1 \cup R_2, V) = E(R_1, V) + E(R_2, V)$$

for any two regions $R_1$ and $R_2$ that do not intersect themselves. Moreover, one has also $$\min_V E(R_1 \cup R_2, V) \geq \min_V E(R_1, V) + \min_V E(R_2, V)$$

Therefore the cost of the merging as defined above is either positive or zero.

The Gain of Merging:

The gain of merging is a measure of improvement in a selected parameter obtained by merging two particular regions into one. The gain of merging can be defined as a measure on the sets of R. However, other definitions are possible. Given two regions $R_i$ and $R_j$, the gain of merging is defined by:

$$G(R_i, R_j) = M(R_i) + M(R_j) - M(R_i \cup R_j)$$

Merging of two particular regions is allowed only if M is such that the gain of merging is positive. Otherwise, merging is not allowed. There are many different candidates for M. The most simple is to set $M(R)=1, \forall R$ so that the gain of merging does not depend on the regions, since it is always equal to 1. One can also set M(R)=Length of the boundary of R. This choice tends to minimize region boundary lengths by penalizing regions having long boundaries. Such regions can have strange shapes, and therefore might be unnatural in an image. This choice provides regions having more regular boundaries than the other choices.

General Process of the Invention

The general process of the invention, illustrated in the block flow diagram of FIG. 1, consists of the following steps:

1. Region estimation (block 100 of FIG. 1). This is the main part of the velocity estimation algorithm. Regions are found using a merging procedure in which two regions are merged if they can move with same model of velocity regardless of which particular velocity model suffices. The merging operations are sorted according to a "merging scale" as described below. This step finishes when merging is no longer possible. The inputs of this step are An initial segmentation, (generally each pixel is a region), and the two images.

a set of possible velocity models (piece-wise constant, affine, and so forth): W, or a progressively inclusive set of the foregoing sets.

a measure of how accurate is a given velocity field in a region: E(R, V).

a measure defined on the connected sets of R, M(R), such that the gain of merging: $M(R_i)+M(R_j)-M(R_i \cup R_j)$ is positive.

a scale parameter: $\lambda \geq 0$.

The outputs of this step are

The final segmentation list and description of the regions.

For each region, the possible models of velocity and their respective errors.

2. For each region, selection of one velocity model (among the set of possible velocity models) is made according to global criteria. (FIG. 1, block 120) After the preceding step, there might be several possible velocity models attached to each region. The aim of the step is to reduce the number of velocity models attached to each region according to some global criteria.

The inputs of this step are some global criteria, the output of the step 1.

The output of this step is a list of the regions and, for each region, a list of the remaining models.

3. Occlusions estimation. (FIG. 1, block 140) The output from the preceding steps is used to finding the pixel-to-pixel matchings between the two frames forward and backward. The occlusions are estimated regarding the non-bijective part of the image defined by these matchings. The input of this step is:

the regions and the possible models of velocities for the matchings, forward and backward.

The output of this step is:

the sets of the occlusions of the matchings, backward and forward.

4. Improvement of the velocity estimates within each region—an optional step. (FIG. 1, block 160). In each region, an attempt is made to find the best velocity field in a set of models larger than the models found in the preceding step. This step can be carried out with standard minimizations techniques.

This treatment separates the occlusions estimation from the region estimations and velocity estimation steps. However, it is possible to couple these steps in any one of many possible implementations, which will not be described herein for the sake of brevity.

Each of the four steps in the foregoing process (of steps 1–4) described above will now be described individually.

REGIONS ESTIMATION

Direct minimization: The regions estimation sub-process is illustrated in the block flow diagram of FIG. 2. In this sub-process, each pair of regions has the following merging scale:

$$P(R_i, R_j) = \left( \min_{V \in W} E(R_i \cup R_j, V) - \min_{V \in W} E(R_i, V) - \min_{V \in W} E(R_j, V) \right) /$$
$$(M(R_i) + M(R_j) - M(R_i \cup R_j))$$

Figure 2:
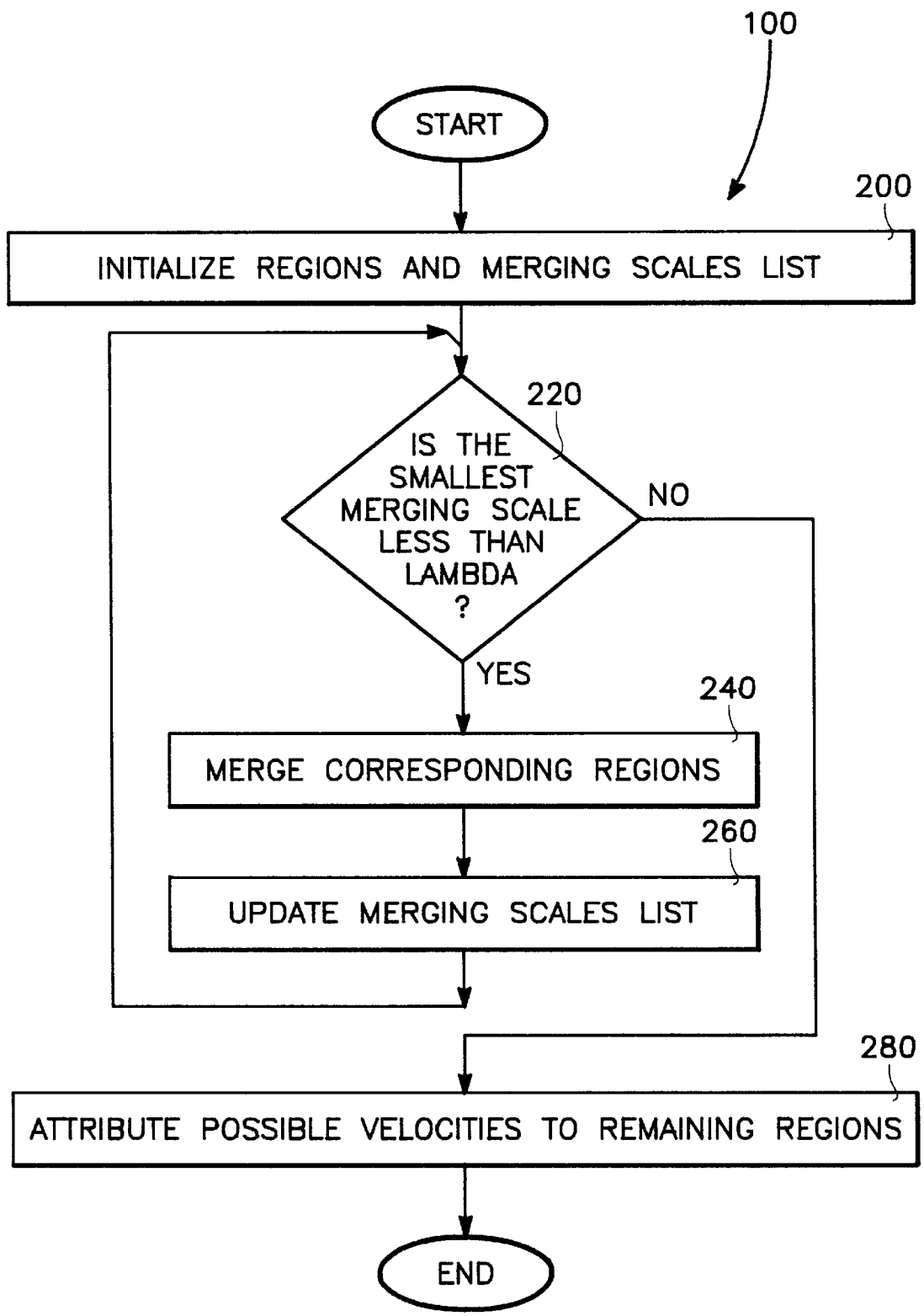
FIG. 2 is a block flow diagram of a region estimation process employed in the process of FIG. 1.

This scale corresponds in a sense to the minimal scale at which merging of the two regions decreases the energy. Therefore two regions having a small merging scale are more similar than two regions having a large one. Two regions are merged if the merging scale is less than or equal to the current scale. This is carried out in the following sub-steps:

1. Initialization (FIG. 2, block 200). The initial regions are defined. Generally each pixel defines a region. But other initializations are possible. The merging scales between all pairs of neighboring regions are computed and added to a list of possible merging.

2. Segmentation (FIG. 2, block 220). $R_i$ and $R_j$ denote the regions having the smallest merging scale ($P(R_i, R_j)$) in the list of possible merging. If this merging scale is larger than the specified scale $\lambda_0$ ("NO" branch of block 220), then the process goes to the third step, i.e., the step of block 280 of FIG. 2. Otherwise ("YES" branch of block 220), the two regions are merged into a new region R (block 240). An update operation (block 260 of FIG. 2) is performed as follows: The regions $R_i$ and $R_j$ are erased from the segmentation, as well their merging scales with other regions. The merging scales of R and its neighbor regions are computed and added to the list of possible mergings.

3. Attribution of possible velocity models to each remaining regions (block 280 of FIG. 2). In each remaining region, the velocity models having the smallest errors are selected as the possible velocity models inside the region, other models being discarded on a region-by-region basis. Determining the "smallest" errors is a user-defined process and can be readily constructed by the skilled worker. Depending upon the noise and other parameters, the models may be selected according to the following criteria:

The models that minimize the error terms. (There might be not only one minimum)

The models that have errors less than a quantity linked to the noise.

Other criteria defined by user.

The most important part in terms of computation is the estimation of the merging scale for each pair of neighbor regions. There are different strategies that can be employed for estimating $P(R_i, R_j)$, depending upon the "shape" of the set of the models of velocities: discrete space or continuous space. The merging scale between two regions $R_i$ and $R_j$ involves the computation of the two quantities: $\min_{V \in W} E(R_i \cup R_j, V)$, and $M(R_i \cup R_j)$, (the others are computed during the creation of $R_i$ and $R_j$, and therefore need not be re-computed). The estimate of $M(R_i \cup R_j)$ in general is without heavy computational cost. But, the other term requires the computation of the minimal error on the merged region for each possible velocity model in the set of velocity models. For discrete images and models, it is always possible to compute for all velocity models the corresponding error and then take the minimum. This method shall be referred to herein as the direct method. Such an approach provides exact results but in general is computationally burdensome. Instead of the direct method, a pyramidal method is preferred which attempts to minimize the number of calculations, and is described below. The result of the pyramidal method is an approximation but is computationally far faster than the direct method. In the case of continuous space of models, the direct method is only possible if one has (depending on the chosen set of models) an algorithm to find the global minima of the errors among the models. If only algorithms that find local minima are available (e.g., gradient descent algorithms), it is preferred to use a continuous technique similar to the pyramidal technique for discrete images and velocity models described above. This technique is based on storage of the local minima for each region in order to optimize the computation of the global minimum for the merged region.

Discrete space of velocity models—Fast implementation: The following fast implementation is the preferred one. This method employs a discrete space of velocities models: $W = \{V_1, \ldots, V_{nb}\}$ where nb is the number of models. Since the images are sampled with pixels, it is always possible to consider a discrete space of velocity instead of a continuous space. The most standard set of velocity is the set of the pixels translations where W is defined by $\{(i,j), \text{ for } i,j \in \{-V, \ldots, V\}\}$ where V is the maximal velocity expected (the size of the image for example).

Pyramidal computation of the errors: The merging scale between two regions $R_i$ and $R_j$ is:

$$P(R_i, R_j) = \left( \min_{V \in W} E(R_i \cup R_j, V) - \min_{V \in W} E(R_i, V) - \min_{V \in W} E(R_j, V) \right) /$$
$$(M(R_i) + M(R_j) - M(R_i \cup R_j))$$

Computation of the foregoing requires that the following quantities be estimated each time a determination must be made whether to merge two regions $R_i$ and $R_j$: $\min_{V \in W} E(R_i \cup R_j, V)$, and $M(R_i \cup R_j)$. And, if the latter quantity is in general very simple to estimate, the former one is computationally intensive. Direct computation of the minima requires calculating the error of matching for each velocity model for the entire region $R_1 \cup R_2$. In other words, it requires an estimate of $\forall V: E(R_i \cup R_j, V))$.

$\forall V, E(R_i \cup R_j, V)$ is the sum of the two quantities: $E(R_i, V)$ and $E(R_j, V)$ which have been computed previously at the merging steps that created $R_i$ and $R_j$. Therefore, $E(R_i \cup R_j, V)$ can be computed as the sum of two quantities already computed. Unfortunately, for a large number of velocity models, it is impossible to store all these quantities for each remaining region. This problem is solved in the preferred method, which is to store only the quantities which, when added together, tend to produce the minimum over the V of $E(R_i \cup R_j, V)$. In other words, what is stored is the "$N_i$" smallest values of $E(R_i, V)$ and the "$N_j$" smallest values of $E(R_j, V)$, and their corresponding models of velocity. The two numbers "$N_i$" and "$N_j$" have to be chosen as a compromise between exact minimization and memory allocation. This associates with each region a "List" of the best matchings. The List contains the N best errors, and their corresponding models of velocity. The List for the region $R_i \cup R_j$, and the quantity $\min_v E(R_i \cup R_j, V)$ are then computed directly and uniquely from the Lists of $R_i$ and $R_j$. That is why the computations are pyramidal in the preferred embodiment.

The Pyramidal Method:

(1) Initialization: The first step is computing the Lists of possible velocities for each initial region. In practice, the initial regions are the pixels of the image.

However, the initialization is valid for any set of regions that do not intersect themselves. For each initial region R:

1. Compute for each $V_i$ in W the associated error: $e_i = E(R, V_i)$.

2. Take the velocity models which have the "N(R)" smallest associated errors: $V_{i_0}, \ldots, V_{i_{N(R)-1}}$, and their associated errors: $e_{V_{i_0}}, \ldots, e_{V_{i_{N(R)-1}}}$. The number N(R) is fixed by a user-defined procedure which is discussed below under the heading "Using the pyramidal method".

3. Set $\text{Max}_e(R)$ equal to the next smallest error.

4. Sort the list with respect to the velocity model numbering, with indices as follows: $0 \leq i_0 < i_1 < \ldots < i_{N(R)-1} \leq nb$. L(R) is the list formed by these indices. The list L(R) is characterized as follows: $V \in L(R)$ if $\exists i \in L(R)$ such that $V = V_i$, and its associated error in R is then $e(V, R) = e_{V_i}$.

Figure 3:
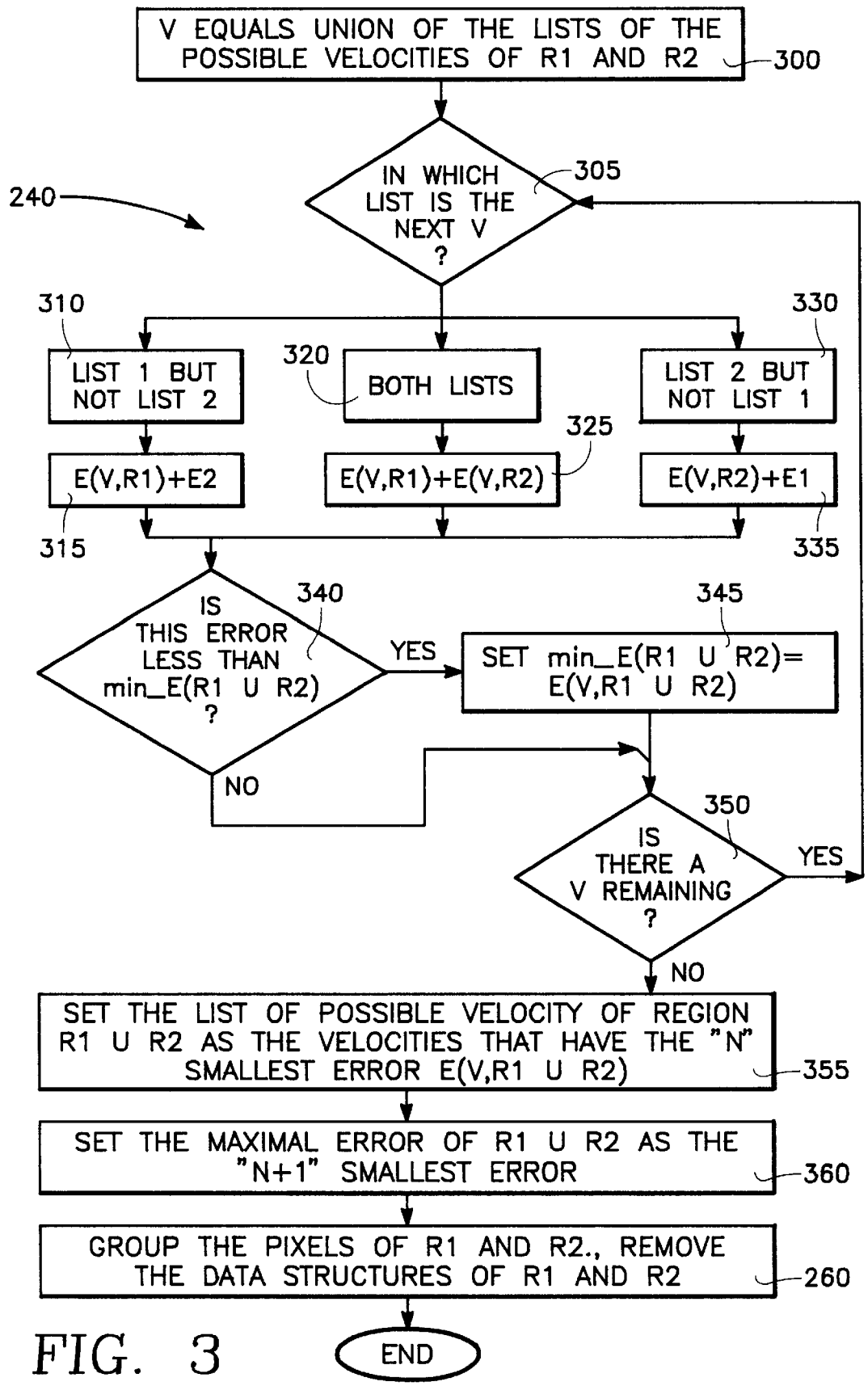
FIG. 3 is a block flow diagram of a merge process employed in the process of FIG. 2.

(2) Merging regions and merging lists: The merging step is illustrated in the block flow diagram of FIG. 3 and consists of the following sub-steps:

(a) Computing the merging scale. The minimal error $\text{Min}_e(R_i \cup R_j)$ is obtained during the computation of the errors for $R_i \cup R_j$. Therefore the merging scale $P(R_i, R_j)$ is directly obtained from the computation of the errors of $R_i \cup R_j$: Given two regions $R_i$ and $R_j$, the errors of the velocities V for the region $R_i \cup R_j$ are defined (block 300 of FIG. 3) from their inclusion in two lists (block 305 of FIG. 3) as follows:

If V is in $L(R_i)$ and $L(R_j)$ (block 320 of FIG. 3), then $e(R_i \cup R_j, V) = e(R_i, V) + e(R_j, V)$ (block 325 of FIG. 3)

If V is in $L(R_i)$ but not in $L(R_j)$ (block 310 of FIG. 3), then $e(R_i \cup R_j, V) = e(R_i, V) + \text{Max}_e(R_j)$ (block 315 of FIG. 3).

If V is in not $L(R_i)$ but is in $L(R_j)$ (block 330 of FIG. 3), then $$e(R_i \cup R_j, V) = \text{Max}_e(R_i) + e(R_j, V)$$

(block 335 of FIG. 3)
This process keeps track of the minimal error and if the latest error computed is less than the previously stored minimal error ("YES" branch of block 340 of FIG. 3), then the previously stored minimal error value is replaced with the latest computed error (block 345 of FIG. 3). Otherwise ("NO" branch of block 340), the process continues as before described until no V remains (block 350 of FIG. 3).

A V which is neither in $L(R_i)$ nor in $L(R_j)$ is not considered. However, its corresponding error can be set to $\text{Max}_e(R_i) + \text{Max}_e(R_j)$. The elements of the lists are sorted with respect to the velocity model, and computational steps are saved if V is not in the lists.

(b) Merging the regions $R_i$ and $R_j$. If $R_i$ and $R_j$ are selected to be merged (smallest merging scale among the neighbor pairs of regions), the two regions are merged and become a new region R. We associate to this new region the list of the "N(R)" smallest errors (block 355 of FIG. 3). The errors associated to $R = R_i \cup R_j$ are obtained as described above. The velocity models corresponding to the "N(R)" smallest errors are selected. The maximal error $\text{Max}_e(R)$ is set as the next smallest error (block 360 of FIG. 3). All the selected models are sorted with respect to the model numbering in order to simplify the next merging. The list L(R) is then defined.

Figure 4:
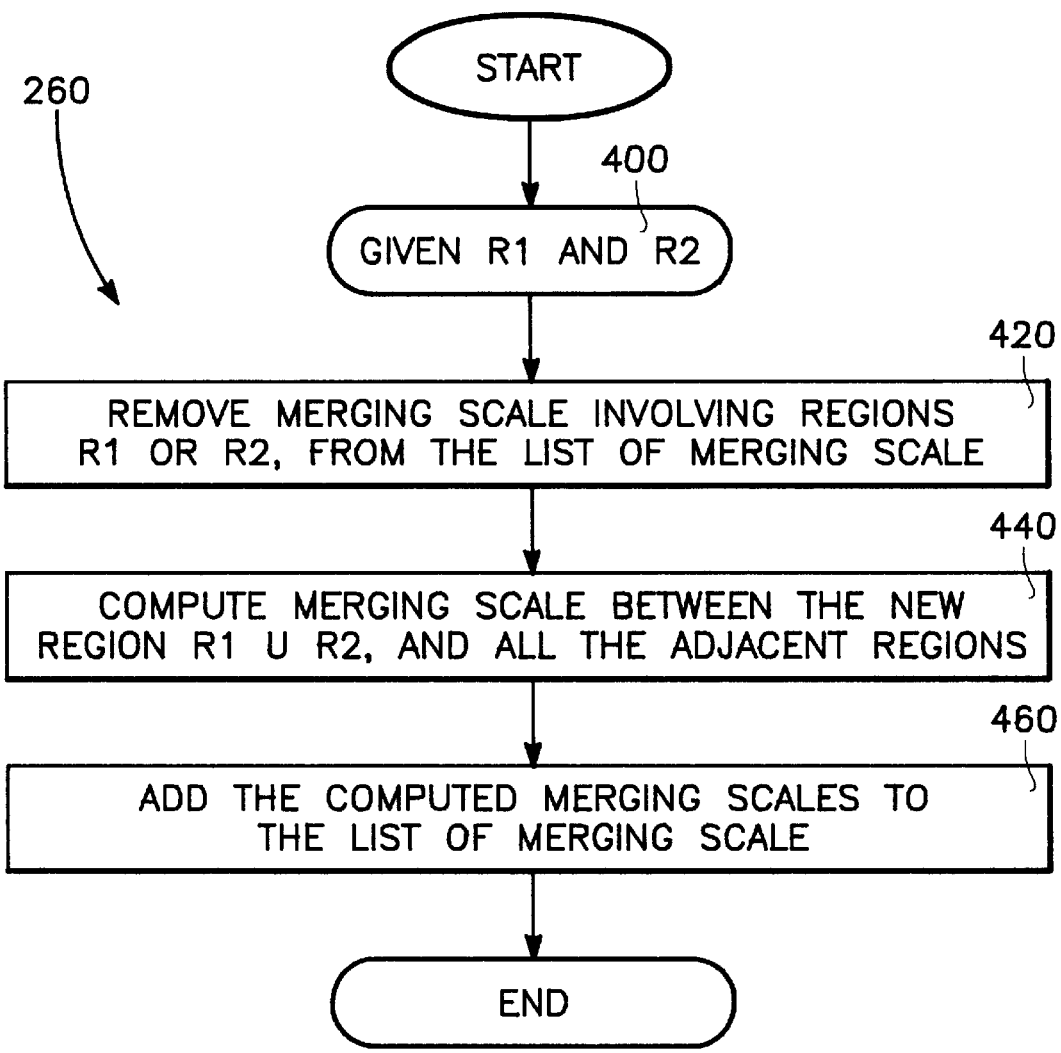
FIG. 4 is a block flow diagram of an update process employed in the process of FIG. 2.

The block flow diagram of FIG. 4 illustrates in greater detail the updating operation of block 260 of FIG. 2. Referring to FIG. 4, the updating operation is given the pixel lists of the two regions $R_i$, $R_j$ that are being merged together (block 400 of FIG. 4). The merging scales of the two individual regions are removed from the list of merging scales (block 420 of FIG. 4). The merging scales of the newly merged region R consisting of the union of $R_i$ and $R_j$ with all adjacent regions are computed (block 440 of FIG. 4). The newly computed merging scales are then added to the list of merging scales (block 460 of FIG. 4).

Figure 5:
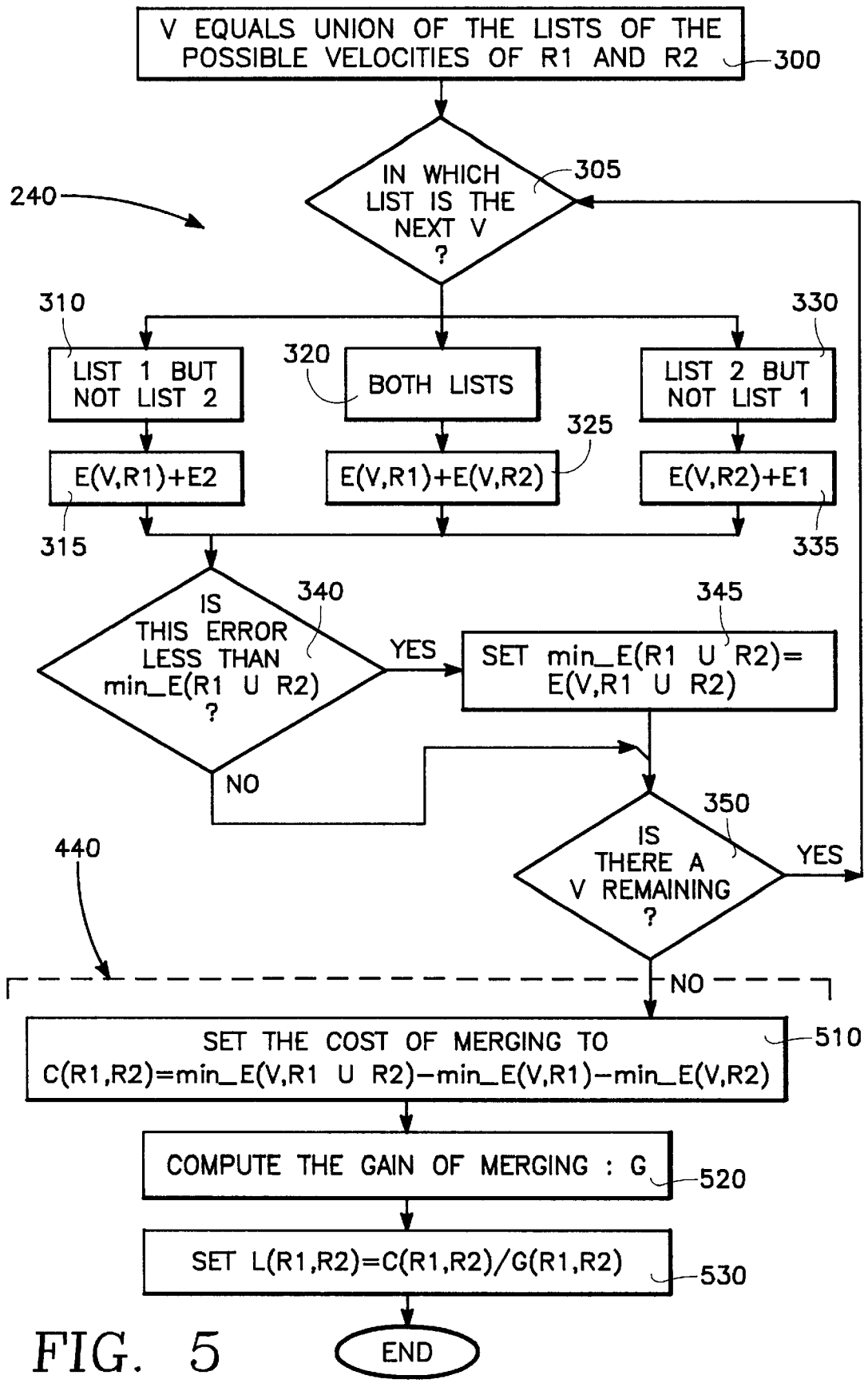
FIG. 5 is a block flow diagram of a computation of the merging scale employed in the process of FIG. 4.

The computation of the merging scales of block 440 of FIG. 4 is illustrated in greater detail in the block flow diagram of FIG. 5. As illustrated in FIG. 5, the computation of block 440 requires the errors computed by the merge process of FIG. 3 at the end of the step of block 350. For each adjacent region, the cost of merging is computed (block 510 of FIG. 5) in accordance with the definition of $C_E(R_i, R_j)$ stated previously in this specification. The gain of merging is also computed (block 513 of FIG. 5) for each adjacent region in accordance with the definition of $G(R_i, R_j)$ stated previously in this specification. From the cost and gain for each adjacent region, the merging scale is computed (block 530 of FIG. 5) in accordance with the definition of $P(R_i, R_j)$ previously given in this specification.

Using the Pyramidal Method

Rule of the maximal error: For any region R the list L(R) contains the "N" smallest errors and their respective velocity model. As for the error of a velocity model which is not in the list, such an error is necessarily larger than the maximal error $\text{Max}_e(R)$. In such a case, in the merging procedure described above, all V which are not in the list L(R) are replaced with a quantity which is no less than the true but unknown (unless directly computed) error E(R, V), namely the maximal error $\text{Max}_e(R)$. In case of fixed list-size, the replacement leads to an underestimate of the error for the merged region. But, the criteria of merging is based to the minimal error, and the probability that the minimal error is made of maximal error is weak. Moreover, the following considerations show that this approximation is justified:

Case of a flat region: A flat region, or a region containing few details, has a large number of possible matchings, and therefore its maximal error will be small. Such a region then has a big tendency to merge. Merging will occur with this region, until the region encloses details that reduce the number of possible matchings.

Case of a non-flat region: Conversely, a region containing sufficient detail to reduce its number of possible matchings has a large maximal error. Then, its value does not matter anymore since the minimal error computed during merging criteria checking will not be achieved by using this value.

How to fix the size N(R) of the lists: It is clear that by limiting the size N(R) of the list L(R) to the number of possible velocity models nb, the exact segmentation will be computed. And, conversely for smaller N(R), the approximation of the errors will be rougher, and therefore the results of the segmentation will be rougher. Therefore a compromise between memory cost and accuracy have to be found. However, in some cases, it is sufficient to only store the errors which are "liable to contribute" to a minimal error when the region is merged with others regions, and still have an exact segmentation. For example, assuming that the velocity between the two frames consists of only translational motions, and that the images are corrupted by an additive noise with a given variance $\sigma^2$, and that V is the true (but unknown) velocity of a region R, then E(V, R) is statistically less than $2*\sigma$ multiplied by the area of R. Therefore, the size of the list of a given region will be fixed such that the maximal error stored is less than $2*\sigma*\text{Area}(R)$. This choice of list-sizes leads to exact minimization. The foregoing example illustrates the meaning of the phrase "liable to contribute" employed above. This example also illustrates that the size of the Lists can depends on the region. In spite of the foregoing, the sizes of all the lists may exceed the memory available, unless a limit is imposed on the list size.

Pyramidal property of the Lists: Given two regions $R_1$ and $R_2$, the list of $R_1 \cup R_2$ is directly computed from and only from the lists of $R_1$ and $R_2$. When a merging occurs the size of the list of the merged region will be less than the sum of the size of the Lists of the two regions merged, which are erased. Therefore, the maximum memory used to store all the lists is achieved at the initialization step.

Weakening pyramidality towards exact computation: If one chooses to limit the size of the lists, but still wants to compute the exact minimization, one can weaken the pyramidality of the Lists. The estimated minimal error $\text{Min}_e(R_i \cup R_j) = e(R_i \cup R_j, V)$, for a V, differs from the true error $E(R_i \cup R_j, V)$ if this V is not in both $L(R_i)$ and $L(R_j)$. That means that $e(R_i \cup R_j, V)$ will be computed using the maximal error of one of the regions $R_i$ or $R_j$. Thus, the computed errors differ from the true ones only when the maximal error is used. It is possible to recompute the list of a merge region $R_i \cup R_j$ if the minimal error is achieved by using the maximal error of the lists $L(R_i)$ or $L(R_j)$. In that case the list $L(R_i \cup R_j)$ will be computed directly from the images and not from the lists $L(R_i)$ and $L(R_j)$. But, this partial lost of pyramidality in the computation of the list should occur in practice very rarely.

Implementation with increasing set of sets of models. Some models of velocities do not make sense when regions are as small as a single pixel. For example, the model of motion corresponding to a zoom of 10% between two images is to be considered for regions having size of at least 5 pixels wide. Therefore there is no need to consider such motion at the beginning of the merging procedure when the regions are one pixel wide. Therefore, it is preferred to begin the merging procedure with a set of models containing the models appropriate at a region size corresponding to a single pixel; then, when the segmentation stops, we consider a larger set of models and continue with the larger set. The purpose of the sequential increase of the set of velocity models is to reduce the number of calculations and the required memory. For example one could consider sequentially the following sets:

1. set of integer translations.
2. set of integer translations combined with a set of large zooms and rotations
3. a set that combines the preceding set and some smaller zooms and rotations Continuous Space of Velocity Models.

With a continuous space of velocity models, the problem is far more complicated than with a finite number of models. Therefore, it is preferable whenever possible to quantify the continuous set of models. However, when not possible or preferable, there are two ways to compute the regions:

Direct minimization. This is the preferred method and has already been described in this specification under the heading "Direct minimization".

Lists methods. In general, methods that give the global minimum, which would provide the best result, are not available. However, there exist many numerical methods that find some local minimum around an initial value. A way to deduce the global minimum from these techniques is to minimize around many initial values and take the minimum of the local minima found. For that, we approximate the set of models, W, by a discrete set $W_I$. Each model of $W_I$ will be a initial value for the minimizations. Therefore the minimum $$\min_{V \in W} E(R, V)$$

will be approximated by $$\min_{V \in W_I} \min\_local_W(E(R, V))$$

where min_local$_W$ stands for the local minimizer in the space W. The problem is that $W_I$ should be large enough have a good approximation. The computation of the minimum involves many uses of the local minimizers which are costly in term of computations. The minimum for the two regions $R_i$ and $R_j$ has a high probability of being achieved around a local minima of $R_i$ and $R_j$. Therefore, it is preferred to consider only the best initial values of $R_i$ and the best initial values of $R_j$ in order to initialize the local minimizer for $R_i \cup R_j$. Then, the algorithm is the following 1. Initialization: For each initial region R, compute around initial values in $W_I$ the local minimum and its respective error. Store in the list L(R) the "N(R)" initial values that give the smallest error, and their respective error. Set Min$_e$(R) to the minimal error found.
2. Computing the merging scale: Given two regions $R_i$ and $R_j$, for each initial value of the lists L($R_i$) and L($R_j$), compute the local minimum of the error for $R_i \cup R_j$. Set Min$_e$($R_i \cup R_j$) to the minimal error found among all the initial values. The merging scale is computed from Min$_e$($R_i \cup R_j$) as before.
3. Merging the regions $R_i$ and $R_j$: If the regions $R_i$ and $R_j$ are selected to be merged, they give a new region R. We construct the list of the new region R by storing the "N(R)" best initial value (the ones which give after local minimization the smallest error).

The aim of this method is to deduce a global minimum while avoiding redundant computations.

Variants.

Using grey-scale segmentation first: It is possible to initialize the regions by something other than the pixels. For example, one can use the results of another segmentation, such as a grey-scale segmentation. If in a particular case there is some information about the regions, it is possible to use such information in a pre-segmentation process.

Multi-resolution: In order to accelerate the process, and to reduce the cost of memory, one can easily define a multi-resolution scheme from all the methods described above. Indeed, it reduces the range of velocity models to be considered on the fine grid level. One only has to consider the range obtained for the coarse grid at the corresponding pixel and its neighbors.

Multi-dimensional data: The algorithms apply also for multi-dimensional data. One just has to define the error terms on this data, by for example adding the errors of each dimension.

Matching several frames with consistent regions: This variant is slightly more complex than the preceding one. Here, we want to match one frame to several frames such that all the matchings have the same regions but might have different possible velocities. We then have to attach to a region a list for each frame we want to match to. The algorithm is the same in terms of regions, but we now have to work with several lists for each region. The cost of merging between two regions is then computed by adding the minimal error obtained for each list separately. And the lists for the merged regions are computed by merging the corresponding lists of the two regions.

Reduction of the Possibilities According to Some Global Criteria.

Merging non-adjacent regions: The merging procedure for adjacent regions (2-normal segmentation) described above can be used to merge non-adjacent regions. While the regions have been estimated, the number of remaining regions is in general small (it should correspond to the number of moving objects), and therefore we can consider all pairs of regions for a non-connected merging. The algorithm of merging is exactly the same than that described above except that we consider all pairs of regions instead of all pairs of adjacent regions. The output of this step is then a set of regions not necessarily connected and made of unions of some connected regions obtained in the 2-normal segmentation. Each of these regions consists of the connected regions that can move with the same velocity model. As before, this produces a reduction of the possible models of velocity for each region, since it will choose those which are compatible with other regions.

Grouping non-adjacent regions that have less disparities in terms of velocity models: If merging non-adjacent regions having pixels that can move with the same velocity model is not sufficient for uniqueness, one can still choose for each region the models that have less disparity with the models of the other regions. The same algorithm can be applied, but with a different error definition. Instead of relying on the error in grey level, we define the cost of merging as a function of the minimal difference between their possible velocities. This assumes the choice of a norm N in the space of the velocity models. The cost of merging regions $R_i$ and $R_j$ is then $$\min_{V \in W(R_i)} \min_{W \in W(R_j)} N(V - W)$$

where W(R) is the list of possible velocity models of the region R, and N denotes a norm on the space of the velocity models. When merging regions, only the models that minimize the cost are retained as possible velocity models. Therefore, each merging reduces the number of possible models for the considered regions.

Occlusions.

Figure 6:
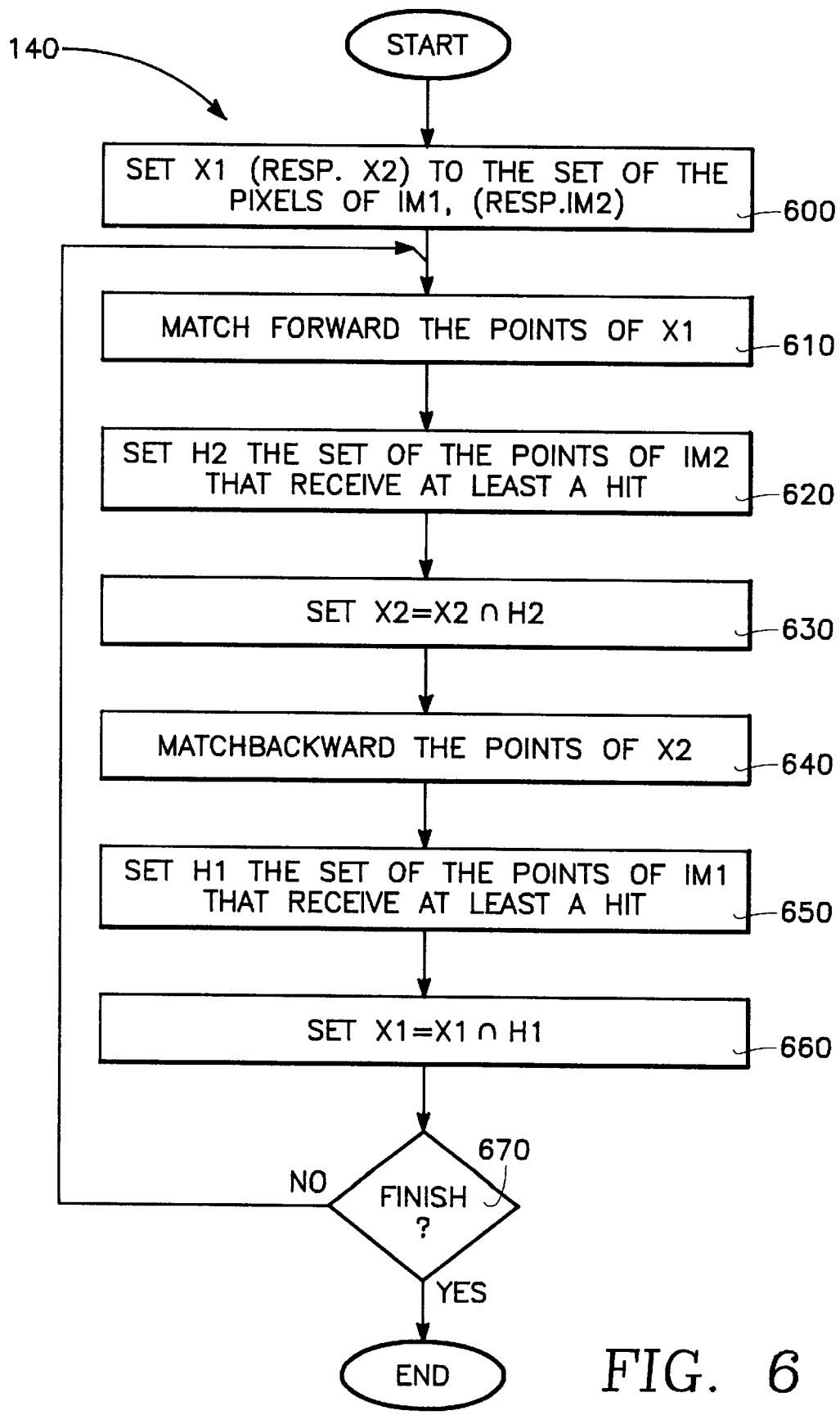
FIG. 6 is a block flow diagram of an occlusion estimation process employed in the process of FIG. 1.

The process of determining which pixels are occluded is illustrated in the block flow diagram of FIG. 6. Occluded points are the points rejected by the process of FIG. 6. This process uses $X_1$ and $X_2$, the set of the pixels of the first and second images, respectively (block 600 of FIG. 6):

Step 0. Initialization: Set $X_1^0 = X^1$, $X_2^0 = X^2$ (no points occluded.)

Step 1. Match forward (block 610 of FIG. 6): Match (via velocity) $X_1^n$ toward $X_2^n$, and decompose the set $X_2^n$ into the two sets: $H_2$ (block 620 of FIG. 6) and $O_2$. Set $X_2^{n+1} = H_2$ (block 630 of FIG. 6) and reject from $X_2$ the points of $O_2$.

Step 2. Match backward (block 640 of FIG. 6): Match (via velocity) $X_1^{n+1}$ toward $X_1^n$, and decompose the set $X_1^n$ into the two sets: $H_1$ (block 650 of FIG. 6) and $O_1$. Set $X_1^{n+1} = H_1$ (block 660 of FIG. 6) and reject from $X_1$ the points of $O_1$. If $X_1^{n+1} \neq X_1^n$ or $X_2^{n+1} \neq X_2^n$ ("NO" branch of block 670), then loop to step 1 (block 610). Otherwise ("YES" branch of block 670), stop.

The final sets: $X_1^n$ and $X_2^n$ define the non-occluded parts of the first and the second images, respectively. Their complementary sets define the points of the first image which are occluded in the second image, and the points of the second image which are occluded in the first image, respectively.

The algorithm stops in a finite number of iterations. The number of iterations is bounded by the number of pixels of an image. The algorithm does not use the complete bijective structure of the velocity of the non-occluded parts.

Linking occlusions to regions. After having found the occlusions by the process described above, the process can try to attach occlusions points to non-occluded ones, and then guess about their possible motion. The idea is to merge an occluded region to a non-occluded region if the first one can move with the second one. As employed herein, the term "can move" means that the shifted location of the occlusion region by one of the possible models of velocity of the non-occluded region is covered by another moving region. It reduces the number of possible velocity models for the non-occluded region. Indeed, not necessarily all the possible models of the non-occluded region would send the occluded region under another moving region. If the merging is done, such models will be removed from the list of the possible ones.

Improvement of the Velocities Estimates Within Each Regions.

Once the regions have been computed, a model of velocity is attached to each region, as described above. This model is an approximation of the velocities within the region. Now, the knowledge of the region plus the approximation of the velocity enables a refinement of the velocities into a wider space of functions than those formed by the models. There are a number of conventional techniques that can perform such a refinement of the velocities.

Frame Fusion.

Introduction to frame fusion. Frame-Fusion merges frames of a sequence in order to produce an image that has a higher resolution than the original frames. This image is called the "super-frame". Due to motion, frames in a moving sequence contain different information of the scene. By superimposing the different information, it is possible to increase the resolution. Fusion of the different data contained in the different frames requires registration of all the objects in motion. It also requires a knowledge of th occlusions, except where there is no occlusion, or only global motion is assumed. The information of the velocities and the occlusions is a result of the velocity estimation process described above. The frame fusion process can assume the following forms:

Creating a super-frame. One chooses a frame of the sequence as the reference frame, and frame fusion is performed with reference to the time of the chosen reference frame. The chosen frame is used to register objects at the frame time of the reference frame. The super-frame will look like the chosen frame but with a higher resolution.

Creating a super-sequence. One can also apply the process described just above for all frames of the sequence successively. We then obtain the entire sequence with a higher resolution for each frame.

In the following, we will only describe the process for the creation of a single super-frame since the creation of the super-sequence is a repetition of this process for all frames.

Matching and Collection of Data.

Let $u_i$, $i \in \{1, \ldots, N\}$ be a sequence of images and $u_{i_0}$ the chosen reference frame. The "collection of data step" consists in determining for each pixel of the other frame whether or not it is occluded at the chosen frame, and if not, its position in this frame. This is expressed in a data list made from all the pixels of the sequence. To each pixel p of the sequence, we associate a datum $d_p$ that contains three components:

a position x: The position is the estimated floating point location of the pixel at the chosen time.

a grey-level u: The grey-level is the grey-level of the pixel in the other frame.

an indicator of occlusion o: The indicator of occlusion is set to zero (0) if the point is found occluded at the chosen time, or otherwise it is set to one (1).

The field position is relevant only if the indicator of occlusion is 1. The datum is computed for all the pixels of the other frame and added to a data list.

Construction of the list from the pixels of the chosen reference frame. Since the chosen reference frame corresponds to the scene at the chosen time, the location of each of its pixels at that time is their locations in the reference frame. The indicator of occlusion is set to 1 for all the reference frame pixels since by definition they are all present (not occluded) in the reference frame.

Construction of the list from the pixels of a frame i other than the chosen reference frame. A determination is made for each pixel of the frame i whether or not it is occluded in frame $i_0$. If it is not occluded, its velocity from frame i to frame $i_0$ is determined. If a pixel p of frame i is found occluded, the occlusion field o of its datum is set to 0, and its other fields are suppressed. If it is not occluded, then its location field is set to its location in the frame i plus its estimated velocity from the frame i to the frame $i_0$. The grey level field of its corresponding datum is set to its grey-level in the frame i, and its occlusion field is set to 1. Repeating these operations for all the frames of the sequence, we obtain a list of data that contains position, grey-level, and whether or not the point is occluded for all the pixels of the sequence.

Construction of the super-frame. For the construction of the super-frame, the process only considers the sub-list of the pixels that are not occluded in frame $i_0$ (o field not equal to zero). The process constructs a first version of the super-frame by interpolating weighted grey-level values of the pixels of the list $L_0$ according to the distance to the considered pixel. The weight of the interpolation decreases exponentially with respect to the distance. However the speed of decrease depends on a "density" function. The density measures the number and distance of the pixels of $L_0$ from the considered pixel. The density is large if there are a many pixels for which the distance is small. The larger the density, the faster is the decrease of the weight with respect to the distance.

Deblurring step. In the preceding step, a grey level value is given to each pixel in a first estimate of the super-frame $\tilde{u}$. These values have been estimated by using a weighted interpolation between grey-level values of the pixels of the sequence. The pixels of the sequence have larger physical size than the pixels of the super-frame (due to the zoom). Therefore their grey-level values correspond to a larger physical size than the size of a pixel of the super-frame. As a consequence the image $\tilde{u}$ is a blurry version of the super-frame U where the blurring kernel is set by the size of the zoom (which coincides with the increase in resolution from the chosen frame to the super-frame). The shape of the blurring kernel depends on the sensors that captured the sequence. However, in general the average is a local uniform average or a Gaussian-weighted one. This implies that the super-frame U is linked to its first estimate by the relation:

$$\tilde{u} = G * U$$

where G is the kernel corresponding to the average. Now, due to noise and other perturbations it is better to consider the last equality as being at least nearly true everywhere, so that $$\int (\tilde{u} - G*U)^2 \leq \sigma_n$$

where $\sigma_n$ is the variance of the assumed noise. Therefore U is given by an inverse problem which is not necessarily well-posed because of its non-uniqueness. Then, among the possible solutions, we choose the one which has the smallest total variation, so that U is defined by the function that achieves the minimum of $$E(U) = \int |\nabla U|$$

subject to the constraint defined by the inequality $\int (\tilde{u} - G*U)^2 \leq \sigma_n$.

The Frame Fusion Process.

Figure 7:
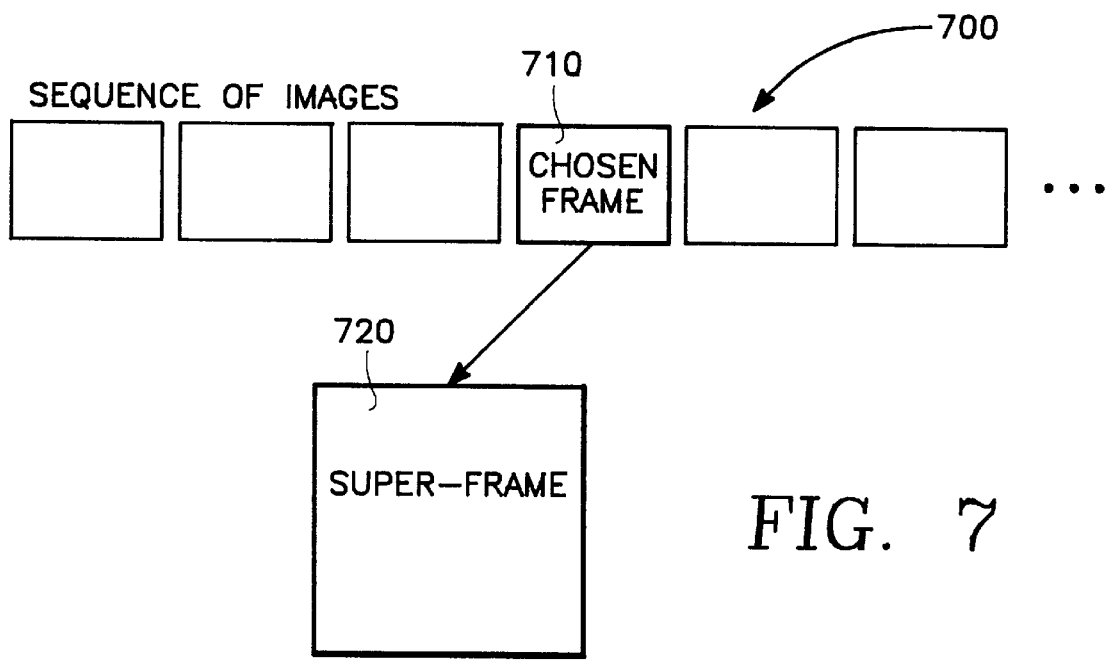
FIG. 7 is a schematic block diagram illustrating the data organization of a frame fusion process employed in carrying out the invention.

The general plan of the frame fusion process is illustrated in the block diagram of FIG. 7 and consists of the following three steps: (1) the collection of data, (2) the construction of a first version of the super-frame, and (3) debluring. The inputs to this process are:

A sequence (700 in FIG. 7) of images: $u_0, \ldots u_N$.

Selection of a particular reference frame (710 in FIG. 7): $u_{i_0}$.

Factor of Zoom: $Zoom_x$ and $Zoom_y$ for the zooms in the x and y directions.

The inputs of the velocity estimation algorithm described above in this specification. These inputs consists of a set of velocity models and a scale parameter.

The outputs from this process are:

The super-frame (720 in FIG. 7): U is the superframe that corresponds in time to the chosen frame $u_{i_0}$.

The major steps of the frame fusion process are depicted in the block flow diagram of FIG. 8 and will now be described with reference to FIG. 8.

Collection of data. The collection of data (block 800 of FIG. 8) corresponds to a registration of non-occluded pixels with the chosen frame. For a pixel p, we call p.x its location in its frame, and p.i the number of its frame, and u(p.x,p.i) its grey-level.

Step 1: Collecting pixels of the frame $i_0$. For a pixel p of the frame $i_0$ (p.i=$i_0$) we set its datum d to
d.x=p.x
d.u=u(p.x, $i_0$)
d.o=1

Step 2: Collecting pixels of the other frames. For each frame i≠$i_0$:

Step 2.1: We match frame i to frame $i_0$ with the algorithm described above in this specification. The output of this matching is for each pixel of the frame i:
whether of not it is occluded in frame $i_0$.
and if it is not occluded, its velocity between frame i and frame $i_0$: $V_{i_0,i}(p)$.

Step 2.2: While the matching is done, for each pixel p of the frame i: If the pixel p is occluded, then we set its datum d to
d.x–
d.u–
d.o=0

And, if it is not occluded to
d.x=p.x+$V_{i_0,i}(p)$
d.u=u(p.x,p.i)
d.o=1

Figure 9:
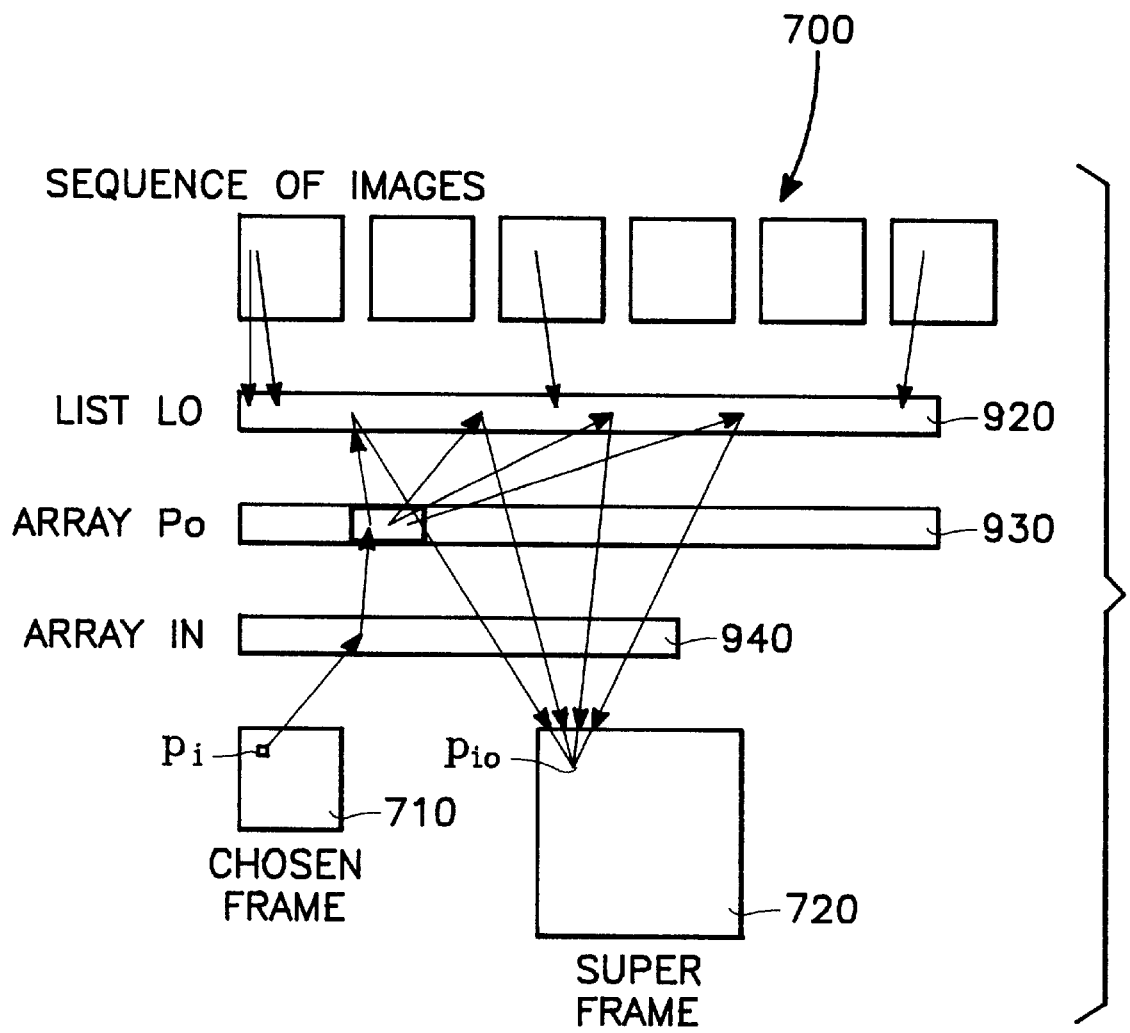
FIG. 9 is a block flow diagram of a data organization step carried out in the frame fusion process of FIG. 8.

Step 3: Organization of the data. The aim of this step is to allow a fast access to the data: given a pixel of the chosen frame, we want to access quickly all the pixels of the sequence of frames. The plan of the data structure for this step is illustrated in the block diagram of FIG. 9 and will now be described with reference to FIG. 9. We consider the sublist (block 900 in FIG. 9) of the data corresponding to the pixels that are not occluded in the frame $i_0$, (d.o≠0). This sub-list, called $L_0$, has a number of entries less than or equal the number of pixels in the sequence of frames. Let us call $N_0$ its size. We define three arrays: Ca, In (block 940 in FIG. 9), and Po (block 930 in FIG. 9). Ca and In (block 940) are integer arrays of the size of one frame. Po (block 930) is an integer array with size $N_0$. Ca will contain for each pixel of the chosen reference frame the number of pixels of $L_0$ that are going in its area. This number is at least equal to 1 since the pixel itself is in the list $L_0$ (block 920). In (block 940) is an index linked to the array Po (block 930). Po is an array of pointers on the list $L_0$. Po and In are organized so that for the pixel number j, Po[k] for k between In[j] and In[j+1]−1 are the entry numbers of the element of $L_0$ that have their location on the pixel j.

Construction of Ca. The array Ca is initialized to 0. Then the following loop is performed on the elements of $L_0$: p. We add 1 to Ca[p.x] (Ca at the integer value of the position p.x). At the end of the loop, Ca associates to a position (in pixels) equal to the number of pixels of the sequence that are registered with the pixel of the chosen reference frame.

Construction of In (940). We set for each i≧0: In[i]= $\Sigma_{j<i}$Ca[j].

Construction of Po (930). The array Ca which is not useful anymore is set to 0, and is used for another purpose. One more loop is peroformed on the elements of the list $L_0$: For a pixel p having a position d.x in frame $i_0$ belonging to pixel j, we set Po[In[j]+Ca[j]]=n where n is its entry number on the list $L_0$. We then add 1 to Ca[j]. When the loop is done, the array Ca is erased.

While all these operations are performed, the access to the pixels that are registered with a particular pixel p of the chosen frame is as follows: If i is the number of the pixel p and k an integer, then these pixels are in the list $L_0$ at the positions Po[k], for k between In[i] and In[i+1]−1.

Figure 8:
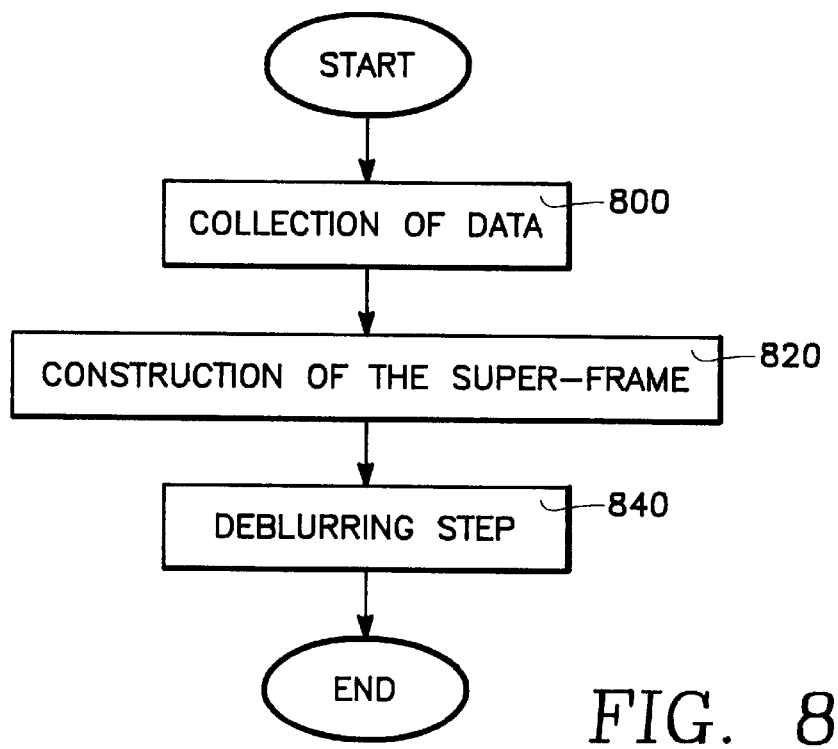
FIG. 8 is a block flow diagram of the frame fusion process.

Construction of the Super-Frame (820 of FIG. 8).

The collection of data step produces a list of pixels with non-integer locations. From this data we have to construct an image by attributing a grey-level value to pixels that have an integer location.

Step 0: Rescaling. Rescaling is performed if the positions of pixels on the List $L_0$ are in the scale of a frame of the sequence, or, in other words, the super-frame corresponds to a zoom version of this frame. We therefore have to re-scale the position of the pixels of the list $L_0$, to positions on the super-frame. We multiply by $zoom_x$, $zoom_y$ the location in x, y, respectively of the pixels of the list $L_0$.

We process a loop on the pixel of the super-frame: p.

Step 1: Estimation of the density around p. The pixel p of the super-frame is contained in a pixel p' of the chosen frame. We consider the neighbourhood of p' made by its connected pixels: $p'_1, \ldots, p'_9$. We define the density around the pixel p as $$d(p) = \sum_{k=1, k \leq 9} \sum_{j=In[p'_k], j<In[p'_k+1]} \exp(-dist(L_0[Po[j]] \cdot x, p \cdot x))$$

where dist(.,.) is a distance. It measures in the expression the distance between the position of the pixel p of the super-frame, and the position of the pixel Po[j] of the list $L_0$ (rescaled in step 0). If this density is small, that means that there is no pixel on the list $L_0$ near the pixel p, and conversely if the density is large that means that there are many pixels that are near. Note that the density can not be equal to zero.

Step 2: Estimation of the grey-level of the pixel p. The grey-level value is set by the following formula:

$$\tilde{u}(p) = \sum_{k=1, k \leq 9} \sum_{j=In[p'_k], j<In[p'_k+1]} L_0[Po[j]] \cdot$$

$$u \exp(-(dist(L_0[Po[j]] \cdot x, p \cdot x))\sigma(d(p)))$$

where σ(d(p)) is given by

σ(d(p))=min(d, M)

The grey-level value is estimated by using an interpolation between the grey-level of the neighbour pixels that are in the list $L_0$. The interpolation is weighted by the distance. The nearer a pixel, the greater its weight in the interpolation. The weight decreases with respect to the distance in an exponential way which is parametrized by σ. The quantity σ is directly linked to the local density, so that if there exists many neighbour pixels, the decrease of the weight will be large.

The Deblurring Step (840 of FIG. 8).

The deblurring step has been discussed above in this specification and is required because the pixels of the sequence of image frames have larger physical size than the pixels of the super-frame. As a result, the image $\tilde{u}$ is a blurry version of the super-frame U, where the blurring kernel G is set by the size of a pixel of the sequence in the finer-grid defined by the super-frame. The super-frame is constructed from $\tilde{u}$ by minimizing the following energy so that U corresponds to a minimum:

$$E(U) = \int |\nabla U|$$

subject to the constraint $$\int (\tilde{u} - G*U)^2 \leq \sigma_n$$

The minimization is performed by solving the Euler-Lagrange equations corresponding to the energy and constraint in accordance with conventional techniques.

Advantages of the Combination of the Velocity Estimation Process and the Frame Fusion Process There are two principal reasons that the velocity estimation process described earlier in this specification provides great advantage when its output is used in the frame fusion process. First, the possible errors of matching have little effect on the quality of the super-frame. Second, the method of determining the occlusions is compatible with the function of frame fusion. The errors of matching attributable to the choice of the eventual parameters, noise or any perturbation do not create artifacts in the super-frame.

The possible errors of matching have virtually no effect on the super-frame. Any matching procedure can make errors. And errors in the velocity estimate can produce artifacts in the frame fusion superframe. A wrong estimate of velocity can cause a merging of different objects into one. Since it is impossible to guarantee that any algorithm that estimates velocity is error-free, it is advantageous to reduce or eliminate the effects of such errors in the superframe. The velocity estimation process described above in this specification ensures that the results will be between the chosen-frame (in case of many velocity estimate errors) and the optimal super-frame (in case of little or no velocity estimate errors).

Dependence of the results of the frames fusion with respect to the scale parameter of the velocities estimates: Selecting the ideal scale, that is the scale that provides the best velocity estimate, is difficult. If the scale is too large, then only the motion of large objects is retained, and the risk is that the process might merge distinct small objects into a single object, thereby introducing artifacts into the super-frame. On the other hand, if the scale is too small, which corresponds to over-segmentation, all the moving objects are found, but the small size of the obtained regions does not necessarily provide a unique velocity estimate. Therefore the chosen velocity might be different from the true velocity, but since it belongs to the set of all possible velocities, the regions will match to a region which is similar. In others words, if a region has "N" different possible velocities, there exist in the other frame "N" similar regions. Each of the possible velocities associates the region to one of the "N" similar regions of the other frame. Therefore in terms of fusion, if the chosen velocity is not the true one, the process fuses the region to one which is similar. The consequence is that there will be no improvement in image quality, but there will no degradation either. If no regions are merged, the result of the frame fusion will be the interpolation of the chosen frame in the finer grid. In summary, a scale parameter which is too large may induce artifacts, while one that is too small only degrades the quality of the optimal super-frame towards the original quality of the chosen frame. As the scale increases from 0 to ∞, the quality increases from the original quality of the chosen frame up to a maximum quality (limit of over-segmentation) and then artifacts will appear (under-segmentation). As discussed previously in this specification, the scale parameter can be set to the variance of the noise, which is the preferred choice.

The effect of the selection of the set velocity models: The result of the velocity estimation depends upon the choice of the set of velocity models. If the set of models is too small (it cannot be too large if there are no memory allocation constraints), then there is over-segmentation, causing a degradation of the quality towards the resolution of the chosen frame. But, no artifacts are introduced into the superframe. Moreover, the set of the translations is sufficiently large to provide superior results.

Advantages Relating to the Occlusion Process.

Determination of the occlusion pixels between the chosen reference frame and each frame in the sequence is preferable because the frame fusion process should be prevented from collecting pixel data of occluded pixels. In order to decide if a pixel or a region is or not occluded, conventional techniques rely upon the error of matching with the best velocity for each pixel. If the error is large (above some threshold), the pixel (or region) is classified as occluded. If the threshold is set too large, some occluded pixels will escape classification as such and therefore will be erroneously included in the super-frame, thereby introducing an artifact. Conversely, if the threshold is too small, non-occluded pixels may be erroneously classified as occluded, so that there will be little or no improvement in image quality. In order to realize an improvement in image quality in conventional techniques, there must be at least some relatively large errors. Otherwise, if all of the errors are small, there is little or no difference between the frames, and the result is a super-frame at least nearly identical to the chosen reference frame except for the zoom factor. This problem is solved in the present invention by determining occluded pixels using a criteria independent of the error of matching. As described above in this specification, the occlusion process of the invention defines occlusions in a very different way. Specifically, occlusions are defined by finding pixels for which no match is found between the chosen frame and a given frame in the sequence. Thus, occlusions are defined in the process of the invention by the matching process and not by any threshold based on the errors of matching.

Summary of a Preferred Process:

A preferred embodiment of the invention is process for obtaining information from at least two image frames of a sequence of frames, each of the frames including an array of pixels, each pixel having an amplitude, one of the two frames being designated as a reference frame and the other being a non-reference frame, the process including the following features which will be enumerated with reference to applicable reference numerals in the drawings of FIGS. 1–9:

(1) defining a set of velocities with which the motion of pixels between the two frames may be modeled;

dividing each one of the two frames into plural regions (block 200 of FIG. 2);

(2) determining an error for each one of at least some of the velocities by carrying out the following steps for each one of the regions and for each union of pairs of the regions:

(A) mapping each pixel of the non-reference frame into the reference frame in accordance with the one velocity (block 300 of FIG. 3), (B) computing an error amount which is a function of a difference in pixel amplitude attributable to the mapping (block 325 of FIG. 3);

(C) designating a minimum one of the error amounts computed for the velocities as the error for the one velocity, whereby a respective error is associated with each of the regions and with each union of pairs of the regions without regard to velocity (blocks 340 and 345 of FIG. 3); and (3) merging qualified ones of the regions by the following steps:

(A) computing for each pair of regions a merging scale which depends upon a gain including a function of (a) the sum of the errors of each pair of regions and (b) the error of the union of the pair of regions (block 440 of FIG. 4);

(B) merging each pair of the regions for which the merging scale meets a predetermined criteria (block 240 of FIG. 2).

The merging scale preferably depends also upon a cost including a function of (a) the sum of the lengths of the boundaries of each pair of regions and (b) the length of the boundary of the union of the pair of regions.

The step of determining an error for each one of at least some of the velocities can include determining an error for each one of all of the velocities.

The process can further include, after the step of merging:

erasing the individual pairs of regions which have been merged and defining their unions as individual regions (block 420 of FIG. 4); and repeating the steps of (a) computing an error for each one of at least some of the velocities, (b) computing a merging scale and merging each pair of regions for which the merging scale meets the criteria (block 440 of FIG. 4), whereby the process includes plural repetitive iterations.

Preferably the step of determining an error for each one of at least some of the velocities includes determining the error for a limited set of the velocities, the limited set of the velocities corresponding to those velocities associated with the N smallest errors computed during a prior iteration of the process, wherein N is an integer (block 355 of FIG. 3).

If each limited set of velocites associated with the N smallest errors is different for different regions, then the step of determining an error includes:

designating as the maximum error for a given region the largest error computed for that region in any prior iteration of the process (block 360 of FIG. 3);

and the step of computing the merging scale includes determining for each pair of regions whether a velocity included in the limited velocity set of one of the regions is not included in the limited velocity set of the other of the pair of regions, and assigning as the corresponding error for the other region the maximum error.

The mapping includes computing a new pixel amplitude in accordance with a weighted average of pixel amplitudes mapped into the reference frame, wherein the weight of each pixel amplitude mapped into the reference frame is a decreasing function of the mapped pixel's distance from a given pixel location in the reference frame.

The mapping step of mapping pixels from the non-reference frame to the reference frame is a forward mapping, and the process can further include determining which ones of the pixels are occluded by carrying out the following steps:

(I) determining which pixels were not matched from the non-reference frame to the reference frame by the merging step following the forward mapping step and removing the pixels not matched from the reference frame (blocks 610 and 620 of FIG. 6);

(II) performing the step of determining an error and the step of merging, except that the mapping step includes a backward mapping of mapping from the reference frame to the non-reference frame, the backward mapping step employing a version of the reference frame in which the pixels not matched have been removed (block 630 and 640 of FIG. 6);

(III) determining which pixels were not matched from the reference frame to the non-reference frame by the merging step following the backward mapping step and removing the pixels not matched from the non-reference frame (block 650 and 660 of FIG. 6);

(IV) comparing the pixels remaining in the reference frame with the pixels remaining in the non-reference frame, and repeating steps I, II and III if there is a difference beyond a predetermined threshold.

The process assigns a velocity to each remaining pixel in the non-reference frame and then adds the remaining pixels of the non-reference frame to the reference frame in accordance with the velocity assigned to each pixel of the non-reference frame to produce an enhanced frame.

The process can further include deblurring the image of the enhanced frame to produce a super frame (block 840 of FIG. 8).

The dividing step can initialize the regions so that each pixel is an individual region.

The model velocities include at least one of: the set of translational velocities, the set of rotational velocities, or the set of zooms.

Preferably, the unions of pairs of regions constitute unions of pairs of adjacent regions only.

The merging scale is computed as a ratio obtained by dividing the cost by the gain, and wherein the predetermined criteria includes a maximum scalar value of the ratio above which merging is disallowed (blocks 510, 513 and 530 of FIG. 5). The scalar value is selected in a range between an upper limit at which the entire image is merged and a lower limit at which no pixels are merged.

The process further includes defining the set of velocities as a simple set during the first one of the iterations of the process, and supplementing the set of velocities with additional velocities as the size of the regions grows. Preferably, the simple set includes the set of translational velocities, and the additional velocities include the set of rotational velocities and the set of zoom velocities.

The reference and non-reference frames can lie in a moving sequence of frames depicting an image having motion, the process further including designating one of the sequence of frames as the reference frame and successively designating others of the sequency of frames as the non-reference frame, and performing all of the foregoing steps for each one of the successive designations of the non-reference frame, whereby the superframe contains information from all the frames of the sequence. Furthermore, the process can further include designating successive ones of the sequence of frames as the reference frame and repeating all of the foregoing steps for each designation of the reference frame so that a super frame is constructed for each one of the sequence of frames.

The step of assigning a velocity to each remaining pixel can be carried out by selecting the velocity for the region of that pixel having the minimum error.

Applications:

The invention has a number of uses. First, the construction of an enhanced image or "superframe" is achieved as described. Secondly, the process may be used to stabilize images of stationary objects. Third, the process may be employed to interpolate frames to smooth out a slow motion sequence. Fourth, the superframe constructed by the invention may be employed to convert between different video formats having different numbers of horizontal lines per frame. For example, in converting from the PAL video format to the NTSC video format, or from NTSC to high definition video, the number of horizontal lines must be increased, which can be accomplished by using the superframe constructed by the invention. Fifth, the invention can be employed in video compression by providing superior predictions of pixel velocities between frames. Sixth, the velocity estimates provided by the invention can be employed in three-dimensional scanning as an improved measure of depth out of the image plane. Finally, the region-by-region velocity estimates can be employed for object removal to remove either all moving objects or remove all stationary objects.

While the invention has been described in detail by specific reference to preferred embodiments, it is understood that variations and modifications thereof may be made without departing from the true spirit and scope of the invention.

What is claimed is:

1. A process for obtaining information from at least two image frames, each of said frames comprising an array of pixels, each pixel having an amplitude, one of said two frames being designated as a reference frame and the other being a non-reference frame, said process comprising:

(1) defining a set of velocities with which the motion of pixels between said two frames may be modeled;

(2) dividing each one of said two frames into plural regions;

(3) determining an error for each one of at least some of said velocities by carrying out the following steps for each one of said regions and for each union of pairs of said regions:

(A) mapping each pixel of said non-reference frame into said reference frame in accordance with the one velocity, (B) computing an error amount which is a function of a difference in pixel amplitude attributable to said mapping;

(C) designating a minimum one of the error amounts computed for said velocities as the error for said one velocity, whereby a respective error is associated with each of said regions and with each union of pairs of said regions without regard to velocity; and (4) merging qualified ones of said regions by the following steps:

(A) computing for each pair of regions a merging scale which depends upon a gain comprising a function of
(a) the sum of the errors of each pair of regions and
(b) the error of the union of said pair of regions;

(B) merging each pair of said regions for which said merging scale meets a predetermined criteria.

2. The process of claim 1 wherein said merging scale further depends upon a cost comprising a function of (a) the sum of the lengths of the boundaries of each pair of regions and (b) the length of the boundary of the union of said pair of regions.

3. The process of claim 1 wherein the step of determining an error for each one of at least some of said velocities comprises determining an error for each one of said velocities.

4. The process of claim 1 further comprising, after the step of merging:

erasing the individual pairs of regions which have been merged and defining their unions as individual regions; and repeating said steps of (a) computing an error for each one of at least some of said velocities, (b) computing a merging scale and merging each pair of regions for which the merging scale meets said criteria, whereby said process comprises plural repetitive iterations.

5. The process of claim 4 wherein the step of determining an error for each one of at least some of said velocities comprises determining said error for a limited set of said velocities, said limited set of said velocities corresponding to those velocities associated with the N smallest errors computed during a prior iteration of said process, wherein N is an integer.

6. The process of claim 5 wherein each limited set of velocites associated with the N smallest errors is different for different regions, and wherein said step of determining an error comprises:

designating as the maximum error for a given region the largest error computed for that region in any prior iteration of said process;

and wherein the step of computing said merging scale comprises determining for each pair of regions whether a velocity included in said limited velocity set of one of said regions is not included in the limited velocity set of the other of said pair of regions, and assigning as the corresponding error for said other region said maximum error.

7. The process of claim 1 wherein said mapping comprises computing a new pixel amplitude in accordance with a weighted average of pixel amplitudes mapped into said reference frame, wherein the weight of each pixel amplitude mapped into said reference frame is a decreasing function of the mapped pixel's distance from a given pixel location in said reference frame.

8. The process of claim 1 wherein said mapping step of mapping pixels from said non-reference frame to said reference frame is a forward mapping, said process further comprising determining which ones of said pixels are occluded by carrying out the following steps:

(I) determining which pixels were not matched from said non-reference frame to said reference frame by said merging step following said forward mapping step and removing said pixels not matched from said reference frame;

(II) performing said step of determining an error and said step of merging, except that said mapping step comprises a backward mapping of mapping from said reference frame to said non-reference frame, said backward mapping step employing a version of said reference frame in which said pixels not matched have been removed;

(III) determining which pixels were not matched from said reference frame to said non-reference frame by said merging step following said backward mapping step and removing said pixels not matched from said non-reference frame;

(IV) comparing the pixels remaining in said reference frame with the pixels remaining in said non-reference frame, and repeating steps I, II and III if there is a difference beyond a predetermined threshold.

9. The process of claim 8 further comprising:

assigning a velocity to each remaining pixel in said non-reference frame;

adding the remaining pixels of said non-reference frame to said reference frame in accordance with the velocity assigned to each pixel of said non-reference frame to produce an enhanced frame.

10. The process of claim 9 further comprising deblurring the image of said enhanced frame to produce a super frame.

11. The process of claim 1 wherein said dividing step initializes said regions so that each pixel is an individual region.

12. The process of claim 1 wherein said velocities comprise at least one of: the set of translational velocities, the set of rotational velocities, the set of zooms.

13. The process of claim 1 wherein said unions of pairs of regions constitute unions of pairs of adjacent regions only.

14. The process of claim 2 wherein said merging scale is computed as a ratio obtained by dividing said cost by said gain, and wherein said predetermined criteria comprises a maximum scalar value of said ratio above which merging is disallowed.

15. The process of claim 14 wherein said scalar value is selected in a range between an upper limit at which the entire image is merged and a lower limit at which no pixels are merged.

16. The process of claim 4 further comprising defining said set of velocities as a simple set during the first one of said iterations of said process, and supplementing said set of velocities with additional velocities as the size of said regions grows.

17. The process of claim 16 wherein said simple set comprises the set of translational velocities, and said additional velocities comprise the set of rotational velocities and the set of zoom velocities.

18. The process of claim 10 wherein said reference and non-reference frames lie in a moving sequence of frames depicting an image having motion, and said process further comprising designating one of said sequence of frames as said reference frame and successively designating others of said sequence of frames as said non-reference frame, and performing all of the foregoing steps for each one of the successive designations of said non-reference frame, whereby said superframe contains information from all the frames of said sequence.

19. The process of claim 18 further comprising designating successive ones of said sequence of frames as said reference frame and repeating all of said foregoing steps for each designation of said reference frame so that a super frame is constructed for each one of said sequence of frames.

20. The process of claim 9 wherein the step of assigning a velocity to each remaining pixel comprises selecting the velocity for the region of that pixel having the minimum error.

21. A method of processing at least two image frames each divisible into similar sets of regions, wherein one of said frames is a reference frame and the other is a non-reference frame, said method of processing comprising:

determining an error based upon discrepancy in pixel amplitude for each one of at least some of a set of velocities for modeling pixel motion between frames for each one of said regions and for each union of pairs of said regions, and wherein said determining an error further comprises:

(A) mapping each pixel of said non-reference frame into said reference frame in accordance with the one velocity, (B) computing an error amount which is a function of a difference in pixel amplitude attributable to said mapping;

(C) designating a minimum one of the error amounts computed for said velocities as the error for said one velocity, whereby a respective error is associated with each of said regions and with each union of pairs of said regions without regard to velocity; and, merging a pair of said regions whose union tends to have a smaller function of said error than the sum of similar functions of the separate regions of the pair.

22. A method of processing at least two image frames each divisible into similar sets of regions, comprising:

determining an error based upon discrepancy in pixel amplitude for each one of at least some of a set of velocities for modeling pixel motion between frames for each one of said regions and for each union of pairs of said regions; and, merging a pair of said regions whose union tends to have a smaller function of said error that the sum of similar functions of the separate regions of the pair, and wherein said merging further comprises:

(A) computing for each pair of regions a merging scale which depends upon a gain comprising a function of
   (a) the sum of the errors of each pair of regions and
   (b) the error of the union of said pair of regions;
(B) merging each pair of said regions for which said merging scale meets a predetermined criteria.

23. A method of processing at least two image frames each divisible into similar sets of regions, comprising:

determining an error based upon discrepancy in pixel amplitude for each one of at least some of a set of velocities for modeling pixel motion between frames for each one of said regions and for each union of pairs of said regions, and wherein the step of determining an error further includes:

a forward mapping step of mapping pixels from a non-reference one of said frames to a reference one of said frames, said process further comprising determining which ones of said pixels are occluded by carrying out the following steps:

(I) determining which pixels were not matched from said non-reference frame to said reference frame by said merging step following said forward mapping step and removing said pixels not matched from said reference frame;

(II) performing said step of determining an error and said step of merging, except that said mapping step comprises a backward mapping of mapping from said reference frame to said non-reference frame, said backward mapping step employing a version of said reference frame in which said pixels not matched have been removed;

(III) determining which pixels were not matched from said reference frame to said non-reference frame by said merging step following said backward mapping step and removing said pixels not matched from said non-reference frame;

(IV) comparing the pixels remaining in said reference frame with the pixels remaining in said non-reference frame, and repeating steps I, II and III if there is a difference beyond a predetermined threshold; and merging a pair of said regions whose union tends to have a smaller function of said error than the sum of similar functions of the separate regions of the pair.

* * * * *